United States Patent
Reinauer

(10) Patent No.: US 8,430,004 B2
(45) Date of Patent: Apr. 30, 2013

(54) TOOL HOLDER

(75) Inventor: Josef Reinauer, Sigmaringen (DE)

(73) Assignee: Mapal Fabrik fur Prazisionswerkzeuge Dr. Kress KG, Aalen (DE)

( * ) Notice: Subject to any disclaimer, the term of this patent is extended or adjusted under 35 U.S.C. 154(b) by 174 days.

(21) Appl. No.: 13/128,017

(22) PCT Filed: Nov. 25, 2009

(86) PCT No.: PCT/EP2009/008378
§ 371 (c)(1),
(2), (4) Date: May 6, 2011

(87) PCT Pub. No.: WO2010/060603
PCT Pub. Date: Jun. 3, 2010

(65) Prior Publication Data
US 2011/0217135 A1 Sep. 8, 2011

(30) Foreign Application Priority Data

Nov. 27, 2008 (DE) .......................... 10 2008 060 164
May 20, 2009 (DE) .......................... 10 2009 022 199

(51) Int. Cl.
*B23B 31/26* (2006.01)
*B23B 31/00* (2006.01)

(52) U.S. Cl.
USPC ............................................. 82/159; 82/160

(58) Field of Classification Search .................... 82/160, 82/159; 407/33, 31; 409/234, 233; 408/239
See application file for complete search history.

(56) References Cited

U.S. PATENT DOCUMENTS 5,186,476 A * 2/1993 Heel et al. .................... 279/2.03
5,346,344 A * 9/1994 Kress et al. ................... 409/234
6,109,152 A * 8/2000 Hecht .............................. 82/160

FOREIGN PATENT DOCUMENTS

| DE | 4117765 A1 | 12/1992 |
| DE | 4220873 A1 | 1/1994 |
| DE | 10241860 | 3/2004 |
| DE | 102005015787 A1 | 10/2006 |
| EP | 0507147 A1 | 10/1992 |

OTHER PUBLICATIONS

Chinese Office Action for parallel application CN 200980147699.1, issued Oct. 25, 2012 (7 pages), with translation of pertinent sections (1 page).
International Search Report (in English and German) for PCT/EP2009/008378, ISA/EP, Rijswijk, NL, mailed Feb. 15, 2010 (6 pages).
International Preliminary Report on Patentability (in German), IPEA/EP, Rijswijk, NL, issued Mar. 1, 2011 (5 pages).
English Translation of International Preliminary Report on Patentability IPEA/EP, Rijswijk, NL, mailed Jun. 30, 2011 (6 pages).

* cited by examiner

*Primary Examiner* — Will Fridie, Jr.
(74) *Attorney, Agent, or Firm* — Harness, Dickey & Pierce, P.L.C.

(57) ABSTRACT

A tool holder includes a hollow taper shank chucking device having a center axis, a chucking device, a tension rod which cooperates with the chucking device and an actuating unit by means of which the tension rod may be actuated, i.e., displaced. The actuating unit has an actuating element which is movable at an angle relative to the center axis and which includes at least one actuating part. The angle may be 90°. The tension rod is provided with at least one engagement part. The actuating part and engagement part form a wedge mechanism which is used to convert a radial motion of the actuating element, i.e., a displacement perpendicular to the center axis, into an axial displacement of the tension rod in the direction of the center axis.

25 Claims, 12 Drawing Sheets

TOOL HOLDER

CROSS REFERENCE TO RELATED APPLICATIONS

This application is a 371 U.S. National Stage of International Application No. PCT/EP2009/008378, filed Nov. 25, 2009. This application claims priority to German Patent Applications DE 10 2008 060 164.0, filed Nov. 27, 2008, and DE 10 2009 022 199.9, filed May 20, 2009. The disclosures of the above applications are entirely incorporated herein by reference.

The invention relates to a tool holder having the features of claim 1.

Tool holders having a hollow taper shank chucking device are known, the design of the hollow taper shank being specified by DIN and ISO.

Tool holders of this type are used to hold tools, as well as adapters, connectors, and the like, which are provided with a hollow taper shank and to fixedly connect same to a mounting. Tools clamped in this manner are used to machine workpieces. For example, chips are removed from a rotating workpiece using a lathe tool. The tool remains stationary, i.e., does not rotate, for example about the center axis of the tool holder. However, tool holders of this type are also able to hold tools in such a way that the tools may be used for drilling, reaming, or milling, whereby they are generally set in rotation. It has been shown that in many cases the overall axial length, i.e., the length measured in the direction of the center axis of the tool holder, is quite large, which limits the fields of application of such a tool holder.

BRIEF SUMMARY OF THE INVENTION

The object of the invention, therefore, is to provide a tool holder whose overall length measured in the direction of the center axis is relatively short, so that even under space constraints the tool holder is able to hold tools which are then used to machine workpieces.

To achieve this object, a tool holder having the features stated in claim 1 is proposed. The tool holder includes a hollow taper shank chucking device having a center axis, a chucking device, a tension rod which cooperates with the chucking device, and an actuating unit by means of which the tension rod may be actuated, i.e., displaced. The tool holder is characterized in that the actuating unit has an actuating element which is movable at an angle of preferably 90° relative to the center axis, and which includes at least one actuating part. Accordingly, the tension rod is provided with at least one engagement part. The distinctive feature of the tool holder is that the actuating part and engagement part form a wedge mechanism which is used to convert a radial motion of the actuating element, i.e., a displacement perpendicular to the center axis, into an axial displacement of the tension rod in the direction of the center axis. Conventional tension rods extend through the tool holder, and are gripped at their end situated inside the tool holder and impinged on by forces acting in the axial direction. In this case hydraulic, pneumatic, or electrical actuators are usually used. It is apparent that the overall axial length of the tool holder is therefore very large. As the result of the motion of the tension rod taking place via a wedge mechanism in this case, it is possible to greatly reduce the overall length of the tool holder.

In one preferred exemplary embodiment of the tool holder, it is provided that the wedge mechanism has a double-acting design. In such an embodiment it is possible to move the tension rod in two directions and actuate the chucking device. Thus, it is possible not only to activate the chucking device for securely clamping the hollow taper of a tool, wherein the at least one collet chuck of the chucking device is displaced radially outwardly, but also to actively move the chucking device into its release position in order to release the hollow shank of a tool. The tension rod is particularly preferably moved further in the direction of the clamped tool in order to eject the tool.

In one particularly preferred exemplary embodiment, it is provided that the actuating element laterally engages with the tension rod. The actuating part of the actuating element becomes operatively connected to the engagement part of the tension rod in order to initiate an axial motion of the tension rod. Thus, when the wedge mechanism is designed in such a way that the forces are laterally introduced into the tension rod, the end of the tension rod situated inside the tool holder remains free, so that a coolant/lubricant may be introduced at that location. The coolant/lubricant is then conducted in a suitable, known manner to an active cutting edge of the clamped tool in order to cool and lubricate same. Thus, the design according to the invention not only results in an axial shortening of the overall length of the tool holder, but also allows a coolant/lubricant to be conducted without special construction effort. In addition, it is possible to guide a drive shaft, a push rod, or some other actuating element through the tension rod.

Another exemplary embodiment of the tool holder is characterized in that a coolant/lubricant control unit is provided, by means of which the course of the coolant/lubricant within the tool holder may be influenced. The coolant/lubricant may thus be conducted from the coolant/lubricant supply to the tool in various ways.

One preferred exemplary embodiment of the tool holder is characterized by a coolant/lubricant tube which is situated coaxially with respect to the center axis and is inserted into the tension rod, and is used to convey coolant/lubricant to the clamped tool, in particular to a coolant/lubricant channel which is centrally provided in the tool. In this case, the coolant/lubricant control unit is adjusted in such a way that the coolant/lubricant is conducted from the supply source to a channel section which is situated in the region of the center axis of the tool holder and which is provided inside the coolant/lubricant tube.

Further embodiments of the tool holder result from the subclaims.

BRIEF DESCRIPTION OF THE SEVERAL VIEWS OF THE DRAWING(S)

The invention is explained in greater detail below with reference to the drawings, which show the following:

DETAILED DESCRIPTION OF THE INVENTION

Figure 1:
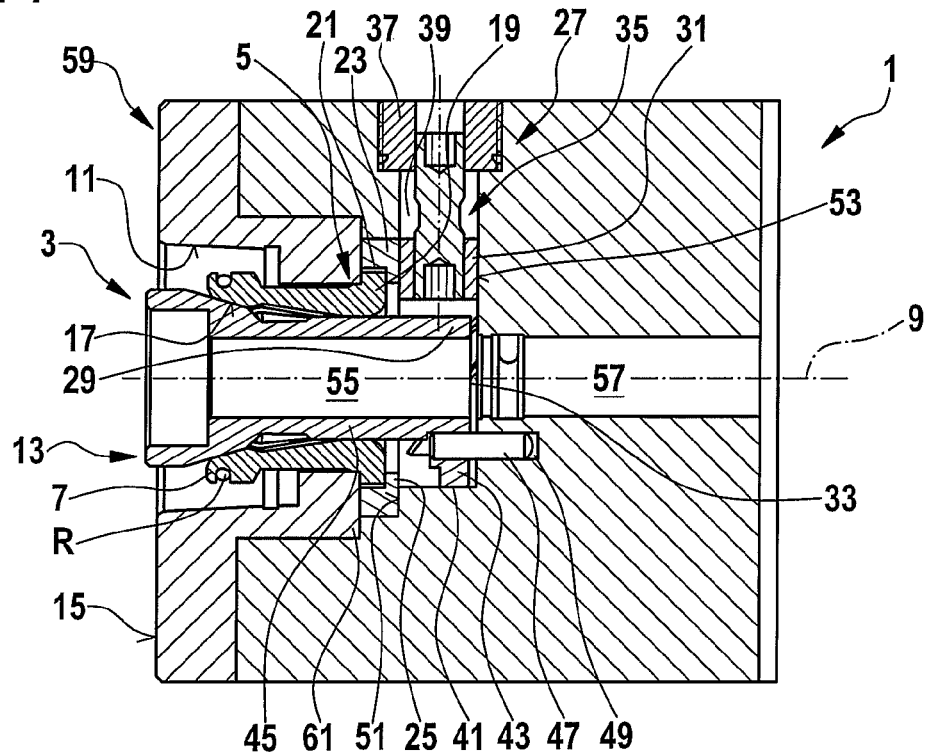
FIG. 1 shows a longitudinal section of the tool holder in which the hollow taper shank chucking device is clamped.

FIG. 1 shows a tool holder 1 having a hollow taper shank chucking device 3. The hollow taper shank chucking device includes a chucking device 5 which has at least one collet chuck 7. To enable the most uniform clamping forces possible to be introduced to a hollow shank of a tool (not illustrated here) which is to be clamped in the tool holder 1, the chucking device generally has multiple equidistantly spaced collet chucks 7 which are situated concentrically with respect to a center axis 9 of the tool holder 1. These collet chucks engage in the hollow shank of the tool, not illustrated here, and cooperate with clamping surfaces, provided on the inner side of the hollow shank, which are designed in such a way that forces which emanate essentially radially from the collet chucks 7, i.e., which act perpendicularly to the center axis 9, are split into a force component which acts radially outwardly and presses the hollow taper shank against a holding surface of the tool holder 1, and forces which pull the hollow shank of the tool in the direction of the center axis 9 and into the tool holder 1. Chucking devices having collet chucks of this type are known, and therefore are not described in further detail.

The tool holder 1 has a tension rod 13 which is situated in the direction of the center axis 9, preferably concentrically with respect to same, and which extends into the interior of the tool holder 1 starting from the end face 15 thereof. The tension rod 13 preferably has a rotationally symmetrical design, and has a tapered first outer face section 17 which widens toward the end face 15, and against which the at least one collet chuck 7 lies. When the tension rod 13 is moved into the interior of the tool holder 1 (to the right in FIG. 1), the at least one collet chuck 7 slides along the first outer face section 17 and is pressed radially outwardly by same. The at least one collet chuck has an end 19, opposite situated from the first outer face section 17, which is accommodated in a holding section 21 which is designed in such a way that when the tension rod 13 moves to the right, the at least one collet chuck is not able to yield in the direction of the center axis 9, but is able to swivel in the region of the end 19.

The holding section 21 for the at least one collet chuck 7 is formed by a spacer disk 23 which is situated concentrically with respect to the center axis 9 and which encloses an inner space that surrounds the holding section 21. A region of the inner space situated to the right in FIG. 1 has a smaller inner diameter, thus forming an axial stop shoulder 25 against which the at least one collet chuck 7 lies, the collet chuck being unable to yield in the direction of the center axis 9 (to the right in FIG. 1).

FIG. 1 shows an actuating unit 27 which is used to move the tension rod 13 in the direction of the center axis 9 of the tool holder 1. Viewed from the end face 15, the actuating unit is situated deeper in the tool holder 1, and cooperates with the end 29 of the tension rod 13 which projects beyond the spacer disk 23 and into the interior of the tool holder 1. The actuating unit has an actuating element 31, also referred to as a thrust sleeve, which in the present case is movable perpendicular to the center axis 9 of the tool holder 1. It will be shown that the actuating element may also be designed to be displaceable at an angle relative to this center axis 9. The actuating element has at least one actuating part 33 which cooperates with an engagement part (not visible here) which is provided at the tension rod 13, forming a wedge mechanism. This wedge mechanism is designed in such a way that when the actuating element 31 moves radially, the actuating part 33 causes an axial displacement, i.e., a displacement in the direction of the center axis 9, of the tension rod 13.

In FIG. 1 the actuating element is in a position close to the center axis 9, i.e., displaced inwardly into the tool holder 1. This causes the tension rod 13 to be moved to the right in FIG. 1, i.e., likewise into the interior of the tool holder 1. As a result, the at least one collet chuck 7, which is not able to yield in the axial direction, slides along the first outer face section 17, and is pushed radially outwardly into its clamped position in which a hollow shank (not illustrated here) of a tool is securely clamped to the tool holder 1.

In the exemplary embodiment illustrated in FIG. 1, all collet chucks of the chucking device 5 are jointly moved radially outwardly, so that the hollow shank of the tool is impinged on by an inwardly acting force in a very uniform manner, and is held and aligned precisely with respect to the tool holder 1.

The actuating element 31 is moved inwardly and outwardly relative to the center axis 9 by means of a suitable drive. A hydraulic, pneumatic, or electric drive or the like may be used. It is particularly simple to manually displace the actuating element 31 using a threaded spindle 35 which is preferably designed as a differential screw, and which, as is known from the prior art, may be provided with two external threaded regions having oppositely directed threads. A first threaded section cooperates with the actuating element 31, and a second threaded section engages in the tool holder 1. For production reasons, in the preferred exemplary embodiment of the tool holder 1 illustrated here a threaded element 37 is provided which is anchorable in the tool holder 1 and which is provided with an internal thread that cooperates with the external thread of the threaded spindle 35. The threaded element 37 is preferably designed as a threaded ring which is anchorable in the tool holder 1 by means of an external thread.

When the tool holder 1 is assembled, the actuating element 31 is inserted into the tool holder 1 before other elements of the hollow taper shank chucking device 3 are installed. It is then possible to screw the threaded spindle 35 into the actuating element 31 over a desired range via an externally accessible opening 39, and then, while holding the threaded spindle 35, to screw the threaded ring into the tool holder 1 and fix same. The threaded spindle 35 may thus be supported on the one hand on the actuating element 31, and on the other hand on the tool holder 1, when the actuating part 33 is to be moved with respect to the center axis 9.

The tension rod 13 is preferably mounted inside the tool holder 1 in such a way that it is supported in the radial direction with respect to the center axis 9. Radial forces are introduced into the end 29 of the tension rod 13 via the actuating part 33 when the actuating element 31 is moved inwardly. The tension rod may be supported on an abutment 41 by means of a projection 43 which originates from the base body 45 of the tension rod 13 and which, viewed from the center axis 9 as shown in FIG. 1, extends downwardly and lies against the abutment 41.

When the actuating element 31 is moved radially outwardly, a force which acts in the radial direction (upwardly in FIG. 1) is introduced via the wedge mechanism into the end 39 of the tension rod 13. The tilting motion of the tension rod 13 thus induced may result in a nonuniform action of force of the tension rod 13 on the at least one collet chuck 7. To prevent this, a pin 47 which extends essentially parallel to the center axis 9 may be provided which is anchored in the projection 43 and which slides in a suitable recess 49 in the tool holder 1. However, it is also conceivable to anchor the pin 47 in the tool holder 1 and to provide a sliding fit between the pin 47 and the recess 49. In any event, the pin 47 ensures that an axial displacement of the tension rod 13 in the direction of the center axis 9 is not hindered, but instead, that the tension rod is held and supported as well as guided when the actuating element 31 moves inwardly and/or outwardly in the radial direction.

It is also apparent from FIG. 1 that the actuating element 31 is supported in a sliding manner on the inwardly situated side face of the spacer disk 23. On the other hand, the actuating element 31 is guided by a support surface 53 inside the tool holder 1. This results in a very compact design of the tool holder 1. It is shown that the tension rod 13 projects only slightly beyond the chucking device 5 into the interior of the tool holder 1, and that the free end 29 projects beyond the spacer disk 23 only enough to allow the actuating element 31 to cooperate with the end 29.

In principle, it is possible to provide the free end 29 of the tension rod 13 with a closing wall, and at this location to provide a wedge mechanism which cooperates with the actuating element 31. In this case, the tension rod 13 could be shorter than illustrated in FIG. 1.

However, the exemplary embodiment of the tool holder 1 illustrated here is characterized in that the actuating unit 31 engages not in the region of the right end face of the tension rod 13, but instead on the exterior, at the end 29 of the tension rod 13. The tension rod 13 may thus be provided with a hollow design and left open at the end 29. Thus, the inner space 55 of the tension rod 13 corresponds to a cavity 57 in the tool holder 1, the inner space 55 and the cavity 57 being in flush and coaxial alignment with the center axis 9. It is thus possible to guide through the tool holder 1 a drive shaft, a push rod, or some actuating element also referred to as a drive element (not illustrated here), which passes through the inner space 55 of the tension rod 13 and engages in a tool inserted in the tool holder. Thus, a tool may be provided which has at least one rotating cutting edge for machining a workpiece, so that drilling, reaming, milling, or the like is possible. Shear and/or tensile forces may be exerted on the tool via a push rod which is axially displaceable in the tension rod 13 in order to actuate tool parts or the like at that location.

Thus, it is shown that the exemplary embodiment of the tool holder 1 illustrated here has a very short length, and that due to the special design of the actuating unit 27 the tension rod 13 may be hollow, so that it is possible to guide a drive shaft through to the tool which is inserted in the tool holder 1. Thus, not just tools having a stationary cutting edge, for example for lathe turning, may be used in the tool holder 1 described here. It is also possible to hold tools which may be used for producing boreholes and/or for machining, or to use milling cutters for appropriate machining of a workpiece. Thus, tools which include sliders or the like, which are displaceable with respect to the tool as a result of forces induced by the push rod, may also be inserted in the tool holder 1.

The tool holder 1 illustrated in FIG. 1 has a mounting flange 59 which covers the end face region of the tool holder 1 into which the tool to be held may be inserted in the tool holder 1. In the present case, the mounting flange extends into the interior of the tool holder 1, encloses the actuating element 31 and the spacer disk 23 in the tool holder 1, and fixes said elements at that location. In other respects, the mounting flange is designed so that the at least one collet chuck 7 is held in the holding section 21. For this purpose, at its end 61 adjoining the spacer disk 23 the mounting flange has an inner diameter which is smaller than that of the holding section 21. Thus, a holding region is provided between the end 61 and the stop shoulder 25 of the spacer disk 23, in which the end 19 of the at least one collet chuck 7 is held in such a way that the end is not displaceable in the axial direction, i.e., in the direction of the center axis 9, but is able to swivel. The tension rod 13 has an outer diameter such that the tension rod securely holds the at least one collet chuck 7 in the holding section 21, so that the collet chuck is not able to yield radially inwardly, i.e., in the direction of the center axis 9.

Thus, simple and secure retention for the chucking device 5 and its at least one collet chuck 7 is provided in a simple manner between the outer face of the tension rod 13 and the end 61 of the mounting flange 59, which is situated inside the tool holder 1, and the spacer disk 23.

Figure 2:
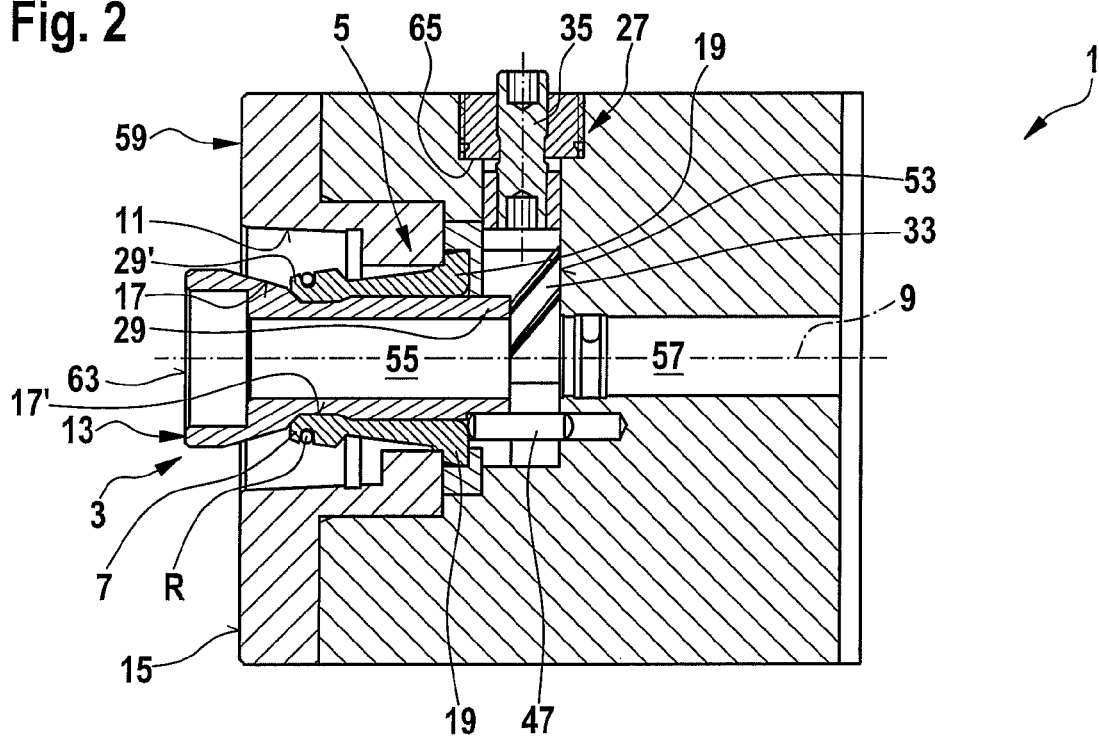
FIG. 2 shows a longitudinal section of the tool holder according to FIG. 1 in which the hollow taper shank chucking device is in its release position.

FIG. 2 shows the exemplary embodiment of the tool holder 1 illustrated in FIG. 1. Identical parts are provided with the same reference numerals; therefore, reference is made to the description for FIG. 1.

FIG. 2 illustrates the chucking device 5 in its release position, i.e., in the position in which a hollow taper shank of a tool may be easily inserted into or removed from the tool holder 1. The at least one collet chuck 7 is swiveled about its end 29 in such a way that its head 29' is swiveled inwardly about the end 29 in the direction of the center axis 9. Thus, the head 29' is no longer situated on the first outer face section 17 of the tension rod 13, but instead lies on a second outer face section 17' which is formed by a depression in the outer face of the tension rod 13, and which has a smaller outer diameter than the first outer face section 17. The head 29' of the at least one collet chuck 7 is thus located far enough inside that the hollow shank of a tool may be easily inserted, without hindrance, into the interior of the tool holder 1, i.e., the mounting flange 59.

To allow the head 29' of the at least one collet chuck 7 to move back in the direction of the center axis 9, the tension rod 13 is moved outwardly from the tool holder 1 in the direction of the center axis 9 (to the left in FIG. 2). This is achieved by moving the actuating element 31 of the actuating unit 27 outwardly from the center axis 9 with the aid of the threaded spindle 35. The actuating part 33 of the actuating element 31 is thus also moved outwardly. Since the actuating element forms a wedge mechanism with an engagement element (not visible here) of the tension rod 13, the outward motion of the actuating element 31 is converted to an axial displacement of the tension rod 13 to the left.

The displacement path of the tension rod 13 may be selected in such a way that the end face 63 of the tension rod strikes against the tool (not illustrated here) and ejects it from the tool holder 1.

The tool holder 1 is thus characterized in that the tension rod 13, which is movable in the direction of the center axis 9 with the aid of a wedge mechanism, causes a tool to be clamped in the tool holder 1 for a motion in a first direction (to the right in FIG. 1), and for a motion in the opposite direction (to the left in FIG. 2) releases the clamped tool and, when appropriately designed, also ejects the tool from the tool holder 1. It is shown here that the actuating element 31 does not have to be moved exactly perpendicular to the center axis 9. When the wedge mechanism is appropriately designed, the path of motion of the actuating part 31 may also extend at an angle with respect to the center axis 9.

During the axial motion of the tension rod 13, the tension rod is not only supported by the pin 47 in the radial direction, but is also guided in the axial direction, i.e., in the direction of the center axis 9.

Thus, in the release position of the chucking device 5 the at least one collet chuck 7 is not impinged by a radially outwardly acting force. Rather, the collet chuck is able to easily yield in the direction of the center axis 9 when a hollow shank of a tool is inserted into or removed from the tool holder 1.

A forced return of the at least one collet chuck 7 is preferably provided. This is achieved in the present case by providing an elastic restoring element R in the region of the head 29' of the at least one collet chuck 7 which is suitably secured against slipping. The restoring element may be designed as an O-ring or as an annular spring or helical spring. In the present case it is provided that an external groove is present in the at least one collet chuck 7, into which the restoring element R, an O-ring, for example, is inserted. If, as in the preferred exemplary embodiment illustrated here, multiple collet chucks 7 are provided in equidistant spacing along the periphery for implementing the chucking device 5, the restoring element R encloses all collet chucks and retracts them in the direction of the center axis 9 as soon as no outwardly acting forces are produced by the tension rod 13.

However, the restoring forces for the at least one collet chuck 7 may also be achieved in some other suitable manner, for example in that the at least one collet chuck 7 is acted on by a pretensioning force at its end 19, which pushes the head 29' in the direction of the center axis 9 so that the head lies against the second outer face region 17' of the tension rod 13.

It is apparent from FIG. 2 that the wedge mechanism may be implemented in two ways: on the one hand the actuating part 33 on the actuating element 31 may be provided by a groove in which an engagement part which is designed as a projection engages at the tension rod 13. On the other hand, a reverse function is also possible, namely, providing a projection at the actuating element which is used as an actuating part 33 and which engages in a groove at the tension rod 13 which provides the engagement part of the tension rod. As is apparent from FIG. 2, in both cases the actuating part 33 is inclined at an angle, preferably an acute angle, relative to the center axis 9. Correspondingly, the engagement part is inclined at the tension rod 13 in order to achieve the wedge mechanism.

The outward displacement of the actuating element 31 from the center axis 9 causes the tension rod 13 to move outwardly (to the left in FIG. 2). As a result, the threaded spindle 35 is set in rotation, its external thread engaging with the actuating element 31 and with the threaded element 37 designed as a threaded ring. For the appropriate rotational direction the actuating element 31 is pulled outwardly due to the fact that a shoulder 65 prevents the threaded element 37 from moving in the direction of the center axis 9. If the threaded element 37 is provided with an external thread, the external thread correspondingly engages with an internal thread of the tool holder 1, in which case the shoulder 65 in principle could be dispensed with.

In principle, the tension rod 13 may also be moved into the release or clamped position by a spring element. In this case, in order to move the tension rod 13 into the clamped or release position the wedge mechanism only needs to apply forces which counteract the spring element. It is then not necessary to provide a double-acting wedge mechanism.

Figure 3:
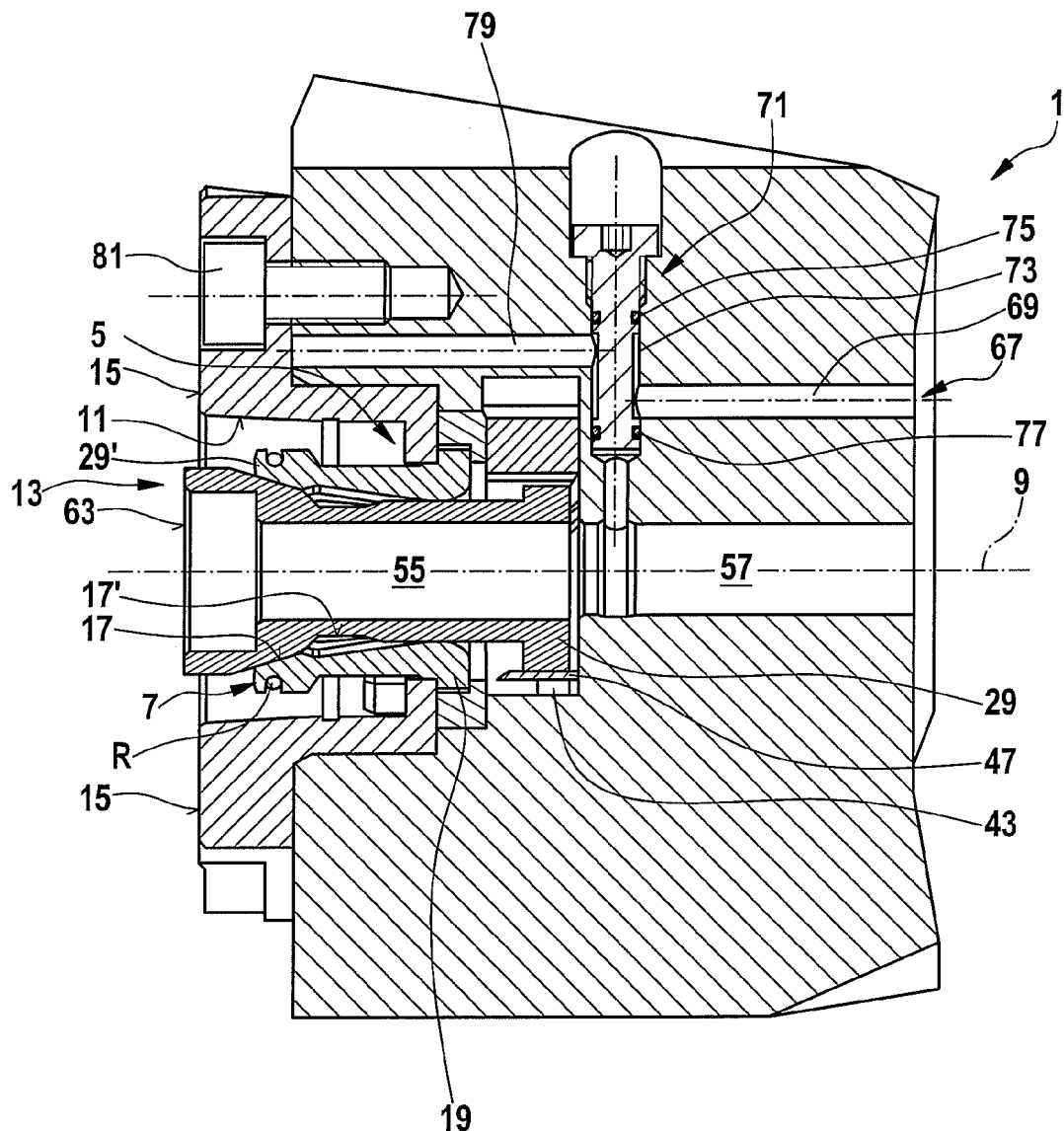
FIG. 3 shows a longitudinal section along a section plane which is tilted with respect to the section plane according to FIGS. 1 and 2, in which a coolant/lubricant control unit is apparent.

FIG. 3 shows the exemplary embodiment of the tool holder 1, explained with reference to FIGS. 1 and 2, in the longitudinal section. In this case the section plane is tilted with respect to that in FIGS. 1 and 2. Identical parts are provided with the same reference numerals; therefore, reference is made to the preceding description.

It is apparent in FIG. 3 that the tool holder 1 has a coolant/lubricant supply 67 by means of which a coolant/lubricant is fed into the tool holder 1. This medium is conveyed via a coolant/lubricant channel 69 inside the tool holder 1 which leads to a coolant/lubricant control unit 71. A first section 73 extends at an angle relative to the coolant/lubricant channel 69, in the present case preferably essentially perpendicular to the center axis 9. The first section opens to the outside, so that the coolant/lubricant control unit 71 may be inserted into this first section 73. The first section 73 is preferably designed as a cylindrical borehole into which the cylindrical base body of the coolant/lubricant control unit 71 is inserted. The base body of the coolant/lubricant control unit 71 preferably has an external thread which engages with an internal thread in the tool holder 1. However, it is also possible to introduce an element which is merely inserted into the first section 73.

The coolant/lubricant control unit 71 has a first sealing section 75 which seals the first section 73, which is in fluid connection with the coolant/lubricant channel 69, from the outside.

At a distance from the first sealing section 75 a second sealing section 77 is provided at the coolant/lubricant control unit 71 which inwardly seals the first section 75, thus preventing the medium from exiting in the direction of the center axis 9.

The first section 73 of the coolant/lubricant supply 67 is in fluid connection with the coolant/lubricant channel 69. Medium flowing in at that location is not able to reach the other side of the two sealing sections 75 and 77. A second section 79 of the coolant/lubricant supply 69 flows in between these two sealing sections. Strictly by way of example, the coolant/lubricant channel 69 and the second section 79 extend essentially parallel to the center axis 9, while the first section 73 is situated essentially perpendicular thereto. It is only important that the coolant/lubricant channel 69 is in fluid connection with the second section 79 via the first section 73, and that the second section 79 opens in the region of the end face 15 of the tool holder 1. Since the second section 79 extends at an angle relative to the section plane of FIG. 3, in the present case the opening of the second section 79 in the region of the end face 15 of the tool holder 1 is not visible.

In the illustration according to FIG. 3 the chucking device 5, the same as in FIG. 1, is shown in its clamped position.

The mounting flange 59 is suitably attached to the base body of the tool holder 1, for example using one or more screws 81 which are indicated in the present case.

Figure 4:
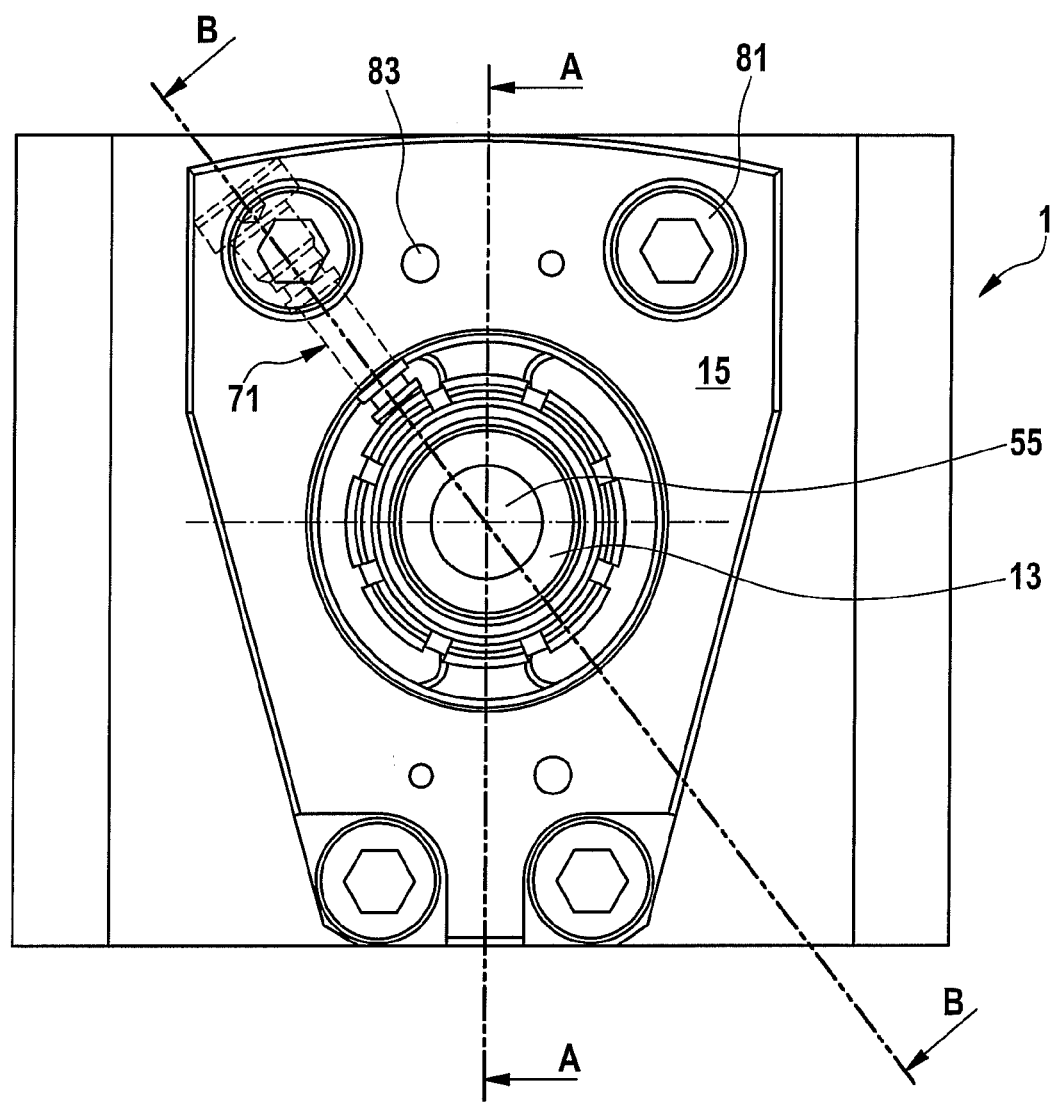
FIG. 4 shows a top view of the end face of the tool holder illustrated in FIGS. 1 through 3, which is part of a star turret.

FIG. 4 shows the exemplary embodiment of the tool holder 1, illustrated in FIGS. 1 through 3, in an end face view, i.e., in a top view of the end face 15. Here as well, identical parts are provided with the same reference numerals; therefore, reference is made to the preceding description.

FIG. 4 shows the section plane of the longitudinal section illustrations according to FIGS. 1 and 2 via a line A-A, and shows the section plane of the longitudinal section illustration in FIG. 3 via a line B-B. It is shown that the coolant/lubricant control unit 71 is situated at an angle relative to an imaginary vertical line. The angle relative to this vertical line is of secondary importance for the function of the tool holder 1 described here, and may therefore be freely selected. It is important that the second section 79 of the coolant/lubricant supply 67 opens into the end face 15, so that the inner space 55 of the tension rod 13 does not have to be used for providing the coolant/lubricant supply. Rather, the inner space together with the cavity 57 in the tool holder 1 is available for guiding through an actuating element, in the present case designed as a drive shaft, by means of which a rotatable tool element in the tool held by the tool holder 1 may be set in rotation. A coolant/lubricant may be conducted via the opening 83 in the second section 79 of the coolant/lubricant supply 67 to the location at a workpiece which is being machined by a tool held by the tool holder 1. The second section 79 in FIG. 3 is illustrated for better understanding, although it does not have to lie, or does not have to lie in its entire length, in section plane B-B. The opening 83 in the end face 15 may be situated in such a way that the mounting flange 59 in the present case may be attached to the tool holder 1 using four screws 81.

The embodiment of the tool holder illustrated here is an example of part of a star turret, at the circumferential surface of which a number of tool holders are situated, as described above.

Figure 5:
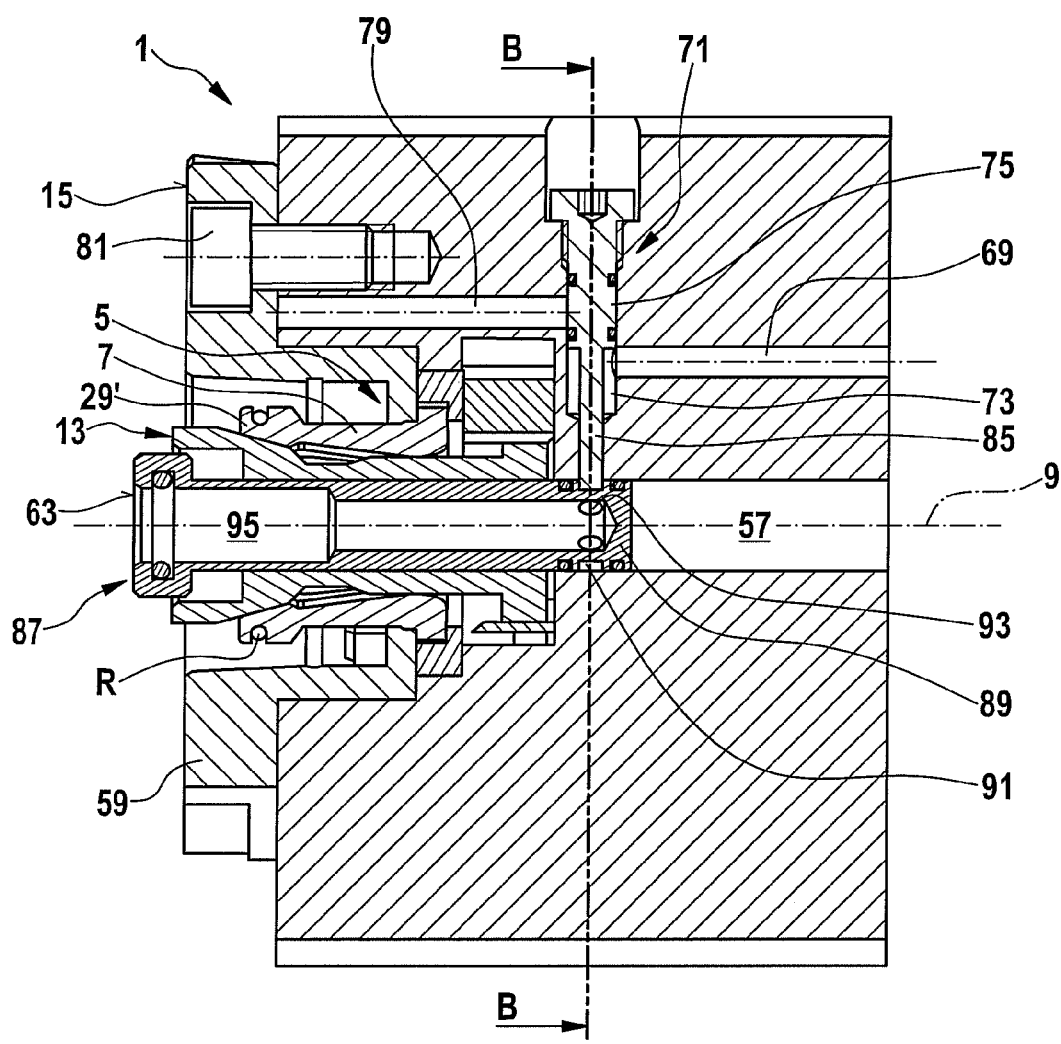
FIG. 5 shows a cross section of a tool holder in a plane in which the cooling/control unit is situated, in this case an exemplary embodiment which is modified from the preceding figures being illustrated.

FIG. 5 shows a modified exemplary embodiment of a tool holder 1. Identical and functionally equivalent parts also present in the first exemplary embodiment according to FIGS. 1 through 4 are provided with the same reference numerals. In other respects, reference is made to the preceding description to avoid repetition.

The tool holder 1 illustrated in FIG. 5 once again has a chucking device 5 having at least one collet chuck 7, preferably having multiple collet chucks 7 equidistantly spaced along the periphery. A tension rod 13 is situated coaxially with respect to the center axis 9 of the tool holder 1, and is displaceable in the direction of this center axis by means of an actuating unit 27. The tension rod 13 is moved to the right in FIG. 5 when an actuating element 31 of the actuating unit 27 is moved at an angle, in the present case 90°, toward the center axis 9. A first outer face section 17 on the circumferential surface of the tension rod 13 causes the at least one collet chuck 7 to swivel outwardly and engage in a hollow taper shank of a tool, not illustrated here, which is inserted in the tool holder 1. The at least one collet chuck 7 exerts an inward force on the hollow taper shank, so that the hollow taper shank on the one hand is pressed against the holding surface 11, and on the other hand is pulled into the interior of the tool holder 1 and thus securely anchored.

The axial displacement of the tension rod 13 is guided by a pin 47 which also provides radial support of the tension rod 13. The pin 47 is designed as a hollow spring element, for example, which is provided with a longitudinal slot to allow easy anchoring in a projection 43 of the tension rod 13 which originates at the inner end 29 of the tension rod 13. In this regard, reference is made to the explanations for the preceding figures.

The same as for the exemplary embodiment according to FIGS. 1 through 4, in the present case a coolant/lubricant supply 67 is provided which includes a coolant/lubricant channel 69, a first section 73 of the coolant/lubricant supply, and a second section 79. Here as well, a coolant/lubricant control unit 71 is provided which may be inserted into the first section 73 from the outside. In the present case a screw is preferably used as the control unit. The coolant/lubricant control unit 71 has a first sealing section 75 which seals off the first section 73 of the coolant/lubricant supply from the outside, but which in the present case also seals off the second section 79, so that coolant/lubricant introduced into the coolant/lubricant channel 69 is not able to pass into this second section 79.

The coolant/lubricant control unit 71 is modified from the exemplary embodiment of FIGS. 1 through 4. The coolant/lubricant control unit has only the first sealing section 75. The first sealing section extends inside the first section 73 of the coolant/lubricant supply, and includes a shoulder 85 whose outer diameter is smaller than that of the first section 75. The shoulder 85 projects into the cavity 57 in the tool holder 1, toward the center axis 9. In the exemplary embodiment illustrated here, a coolant/lubricant tube 87 is provided at that location which extends concentrically with respect to the center axis 9 and through the hollow tension rod 13. Thus, in the present case the cavity 57 does not extend to the end face 15 of the tool holder 1. Therefore, the tool holder 1 illustrated here cannot be set in rotation via a drive shaft. The tool holder 1 is therefore suitable for stationary tools which are fixedly connected to the tool holder 1 via a hollow taper shank of the chucking device 5.

The coolant/lubricant tube 87 is closed at its inner end on the end-face side. The coolant/lubricant tube has an annular groove 91 introduced into its circumferential surface, in which the shoulder 85 of the coolant/lubricant control unit 71 engages and thus fixes the coolant/lubricant tube 87 in the axial direction. In the present case the coolant/lubricant control unit 71 is thus designed as a fixing screw for the coolant/lubricant tube 87. The first section 73 is in fluid connection with the annular groove 91; i.e., a medium for cooling and/or lubricating the tool which is introduced into the coolant/lubricant channel 69 passes through the first section 73 as far as the annular groove 91. This annular groove is connected to the interior 95 of the coolant/lubricant tube 87 via at least one borehole 93, preferably multiple boreholes 93. A medium provided by the coolant/lubricant supply 67 may thus be conveyed through the coolant/lubricant tube 87 to a tool which is held by the tool holder 1. The tool preferably has a coolant/lubricant attachment which is inserted into the left end of the coolant/lubricant tube 87 in a sealing manner. Thus, a channel section of the coolant/lubricant supply is provided by the inner space of the coolant/lubricant tube 87.

Overall, it is shown here that the basic design of the two tool holders according to FIGS. 1 through 4 and 5 is the same, except that in the special embodiment of the coolant/lubricant control unit 71 a provided medium is not delivered via the second section 79 of the coolant/lubricant supply to the end face 15 of the tool holder 1, but, rather, is delivered inwardly into the interior 95 of a coolant/lubricant tube 87 which is inserted into the hollow tension rod 13, thus achieving a centralized coolant/lubricant supply in the present case.

To release the chucking device 5, the actuating unit 27 is activated as explained with reference to FIG. 2, so that the actuating element 31 is moved outwardly, i.e., away from the center axis 9, by a threaded spindle 35 at an angle of preferably 90° relative to the center axis 9. Here as well, a wedge mechanism is achieved between the actuating unit 27 and the tension rod 13, so that the outward motion of the actuating element 31 causes an axial displacement of the tension rod 13 to the left, thus allowing the at least one collet chuck 7 to swivel back in the direction of the center axis 9, optionally under the action of a restoring element R. Here as well, the tension rod 13 may be moved to the left until its end face 63 ejects a tool inserted in the tool holder 1.

When the chucking device 5 is actuated, i.e., when the tension rod 13 is moved, the shoulder 85 which engages in the annular groove 91 of the coolant/lubricant tube 87 prevents axial displacement of this tube in the cavity 57 of the tool holder 1. A coolant/lubricant supply which extends via the coolant/lubricant channel 69 and the first section 73 is thus continually ensured.

Figure 6:
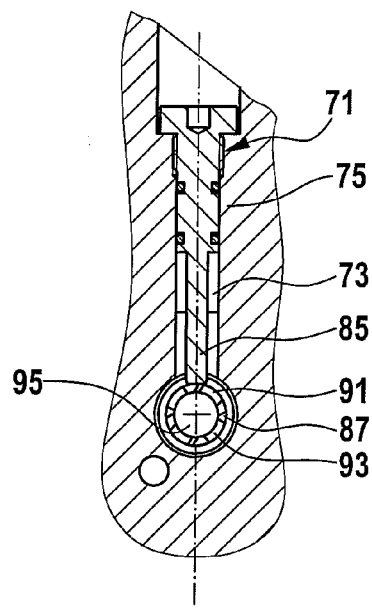
FIG. 6 shows a detail section of the coolant/lubricant control unit in which the section plane is rotated by 90° compared to FIG. 5.

FIG. 6 shows a longitudinal section of the coolant/lubricant control unit 71, the section plane being rotated by 90° with respect to the illustration in FIG. 5 and extending along line B-B in FIG. 5. Identical parts are provided with the same reference numerals; therefore, reference is made to the preceding description.

The coolant/lubricant control unit 71 may include a mounting element. However, a screw which is screwed into the tool holder 1 is preferably used. The coolant/lubricant control unit includes a first sealing section 75 which seals the first section 73 of the coolant/lubricant supply from the outside. A fluid connection is established by grooves or boreholes which are provided next to the shoulder 85 and which extend between the first section 73 and the annular groove 91, so that a coolant/lubricant medium is able to pass through the at least one borehole 93 and into the interior 95 of the coolant/lubricant tube 87 and be made available to a tool which is held by the tool holder 1.

Figure 7:
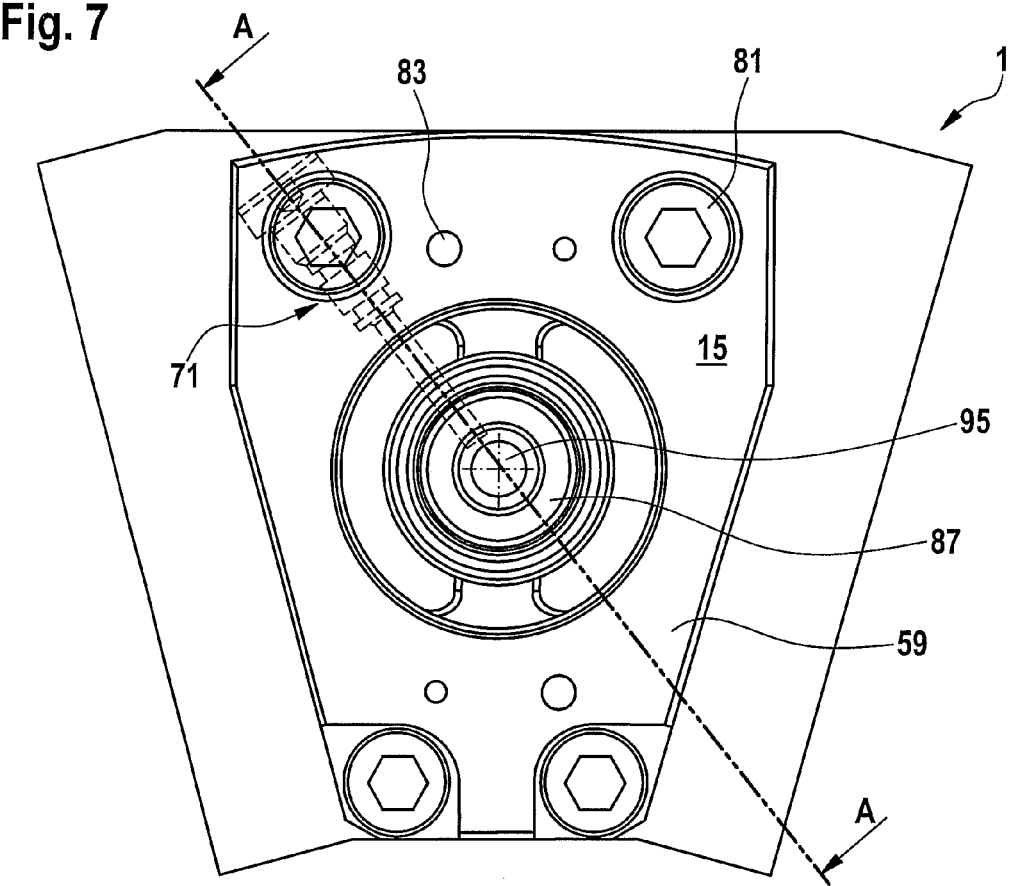
FIG. 7 shows an end face view of the tool holder according to FIG. 5, which in the present case is designed as a drum turret.

FIG. 7 shows a top view of the tool holder 1 as illustrated in FIG. 5. In this case it is apparent that the coolant/lubricant control unit 71 is once again situated at an angle relative to an imaginary vertical line. However, the coolant/lubricant control unit is designed in such a way that coolant/lubricant is not able to reach the end face 15 of the tool holder 1. Thus, when this coolant/lubricant control unit 71 is used the opening 83 is sealed off in such a way that coolant/lubricant cannot exit at this location, and all of the medium of the centralized coolant/lubricant supply is provided via the interior 95 of the coolant/lubricant tube 87.

In the illustration according to FIG. 7, it is apparent that the mounting flange 59 is fixed to the base body of the tool holder 1 with the aid of at least one screw 81, in the present case, four screws. The tool holder is designed as a drum turret having a number of tool holders 1 provided at its end face, as previously explained with reference to FIGS. 5 and 6.

Figure 8:
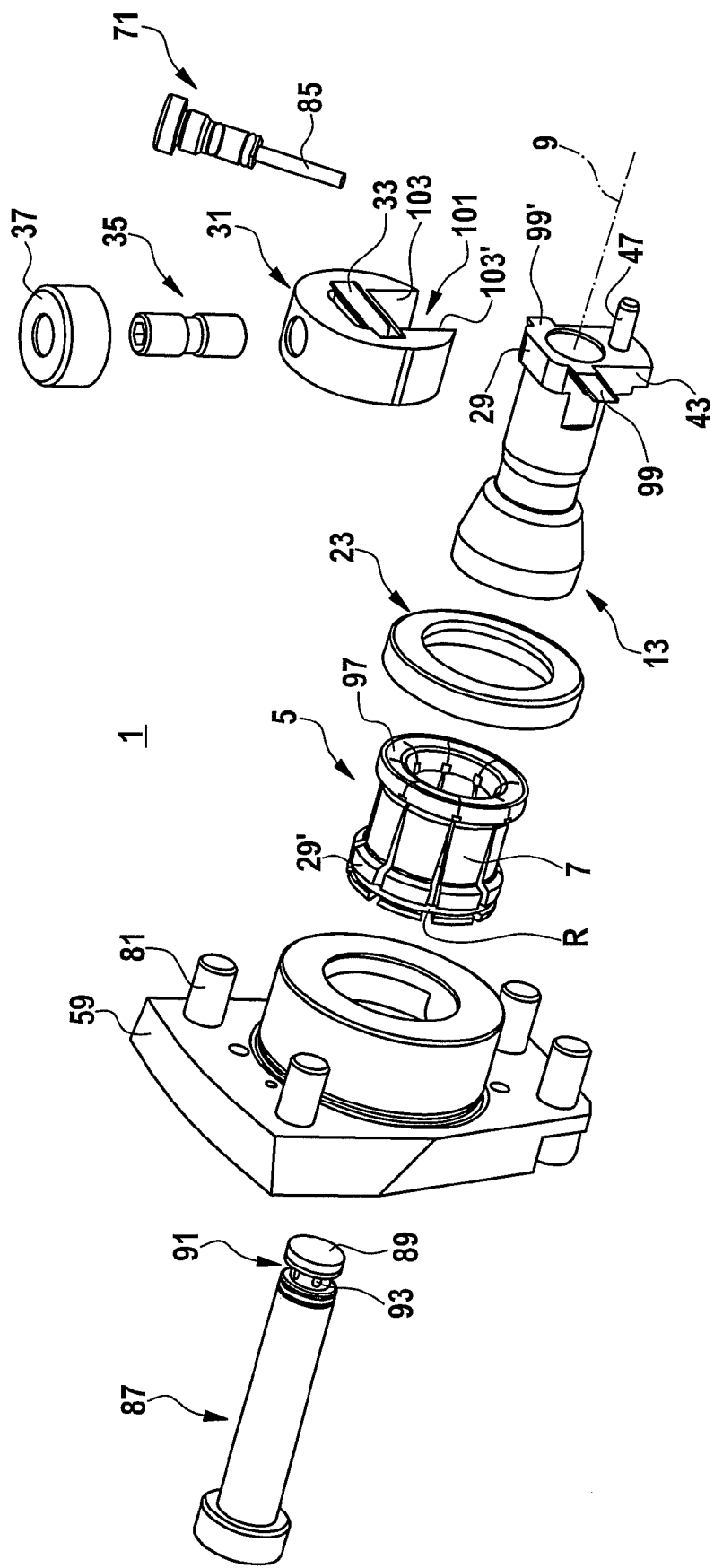
FIG. 8 shows a perspective exploded illustration of a portion of the tool holder illustrated in FIGS. 5 through 7.

FIG. 8 shows parts of a tool holder 1 which have been illustrated in FIGS. 5 through 7. Identical and functionally equivalent parts are provided with the same reference numerals; therefore, reference is made to the preceding description.

The exemplary embodiment of the tool holder 1, having a coolant/lubricant tube 87 which may be inserted into the hollow tension rod 13, is described here. The end-face closure at the interior end 89 of the coolant/lubricant tube 87 is apparent, as well as the annular groove 91 having at least one, preferably multiple, borehole(s) 93 in its base which connect(s) the interior 95 of the coolant/lubricant tube 87 to the annular groove 91. In the assembled state of the tool holder 1 the shoulder 85 of the coolant/lubricant control unit 71 which is used as the fixing screw, as described above, engages in this annular groove.

The chucking device 5, which in the present case has multiple collet chucks 7 spaced apart from one another, is situated at a distance from the mounting flange 59, through which at least one screw 81 passes. The collet chucks 7 are connected to one another via a retaining element 97 at the right end of the chucking device 5, which greatly simplifies installation of the chucking device 5. The retaining element 97 is accommodated by the spacer disk 23 and is pressed against the mounting flange 59. It is thus easily possible to have the collet chucks 7 originate from the ring 97 in a preferred direction so that the collet chucks lie against the outer face of the tension rod 13, for example, under pretension. However, as described above, it is also possible to provide an O-ring as an elastic restoring element R in the region of the head 29' of the collet chucks 7 which places the heads 29' of the collet chucks against the tension rod 13.

The projection 43 of the tension rod 13 is clearly discernible in the perspective illustration of the tool holder 1, as well as the pin 47 which is used to guide the tension rod 13 in the axial and radial directions.

The at least one engagement part 99 of the tension rod 13 on the exterior of the tension rod 13, which cooperates with the actuating part 33 of the actuating element 31, is apparent here.

In the exemplary embodiment illustrated here, the tension rod 13 has two oppositely situated engagement parts 99, so that the forces acting in the axial direction act uniformly on the tension rod 13 so that it does not tilt.

The actuating element 31 has a receiving slot 101 which has at least one inner face 103 at which the actuating part 33 is situated. In the present case, the actuating element 31 has a receiving slot 101 which is delimited by two essentially parallel inner faces 103 and in which the end 29 of the tension rod 13 comes to rest.

In principle, it is possible to provide a laterally open receiving slot 101 in the actuating element 31, at the one inner face 103 of which an actuating part 33 is provided. The tension rod 13 may be supported in a suitable manner on the pin 47 or on an inner face in the tool holder 1. However, two inner faces 103 are preferably provided to be able to provide two oppositely situated actuating parts 33 which engage on both sides of the tension rod 13 and therefore uniformly introduce forces into same. The actuating parts 33 and the engagement parts 99 form a wedge mechanism, regardless of which of the two parts is provided as the projection and which is provided as the groove.

In the exemplary embodiment illustrated here, grooves are provided on the inner faces 103 of the receiving slot 101 of the actuating element 31 which cooperate with engagement parts 99 on the tension rod 13 which are designed as projections.

As described above, the actuating parts 33 and engagement parts 99 extend at an angle relative to an imaginary center axis 9 of the tool holder 1. An angle of approximately 40° relative to an imaginary line extending perpendicularly to the center axis 9 is preferably selected in order to achieve a balanced ratio of the displacement path of the parts associated with the wedge mechanism to the force exerted by the tension rod 13 or the at least one collet chuck 7. It is important that forces are introduced into the hollow shank of a tool via the tension rod 13 and via the at least one collet chuck 7 which are large enough to ensure secure clamping in the tool holder 1.

FIG. 8 also shows the threaded spindle 35 which has two threaded sections, a first section engaging in the actuating element 31, and a second section engaging in the threaded element 37, which in the present case is designed as a threaded ring. The threaded sections of the threaded spindle 35 are preferably provided with opposite pitches, so that a rotary motion of the threaded spindle causes a relatively large displacement of the actuating element 31 in one direction.

Figure 9:
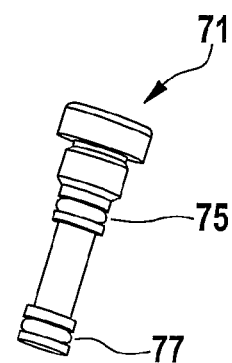
FIG. 9 shows a perspective view of the coolant/lubricant control unit which is used in the exemplary embodiment of the tool holder according to FIGS. 1 through 4.

Lastly, FIG. 9 also shows the coolant/lubricant control unit 71 of the exemplary embodiment of the tool holder 1 illustrated in FIG. 3. This exemplary embodiment of the coolant/lubricant control unit 71 is used to connect two channels of the coolant/lubricant supply, extending essentially parallel to the center axis 9, to one another and to allow the medium to exit from the end face 15 of the tool holder 1.

From the above descriptions it is apparent that various coolant/lubricant guides are possible for tool holders 1 which are designed as a drum turret or a star turret. In both exemplary embodiments it is possible to ensure a central exit of the coolant/lubricant medium into the holding region of a tool, as well as an exit from the end face 15 of the tool holder 1.

In the exemplary embodiment according to FIG. 3, it is provided that the coolant/lubricant control unit 71 is designed in such a way that a fluid connection between the first section 73 of the coolant/lubricant supply 67 and the cavity 57 may be closed by the coolant/lubricant control unit, while a fluid connection between the first section 73 and the second section 79 of the coolant/lubricant supply 67 may be enabled. Thus, if a coolant/lubricant control unit 71 according to the exemplary embodiment of FIG. 3 is used, the configuration of the first sealing section 75 and of the second sealing section 77 allows coolant/lubricant from the coolant/lubricant channel 69 to flow through the first section 73 and into the second section 79. At the same time, the second sealing section 77 seals off the coolant/lubricant supply 67 with respect to the cavity 57. Thus, only one decentralized supply of coolant/lubricant is provided, which is available at an opening 83 in the end face 15 of the tool holder 1.

The exemplary embodiment according to FIG. 5 shows a coolant/lubricant control unit 71 which is designed in such a way that a fluid connection between the first section 73 of the coolant/lubricant supply 67 and the coolant/lubricant tube 87 may be enabled by the coolant/lubricant control unit, while a fluid connection between the first section 73 and the second section 79 of the coolant/lubricant supply 67 may be closed. Thus, in the present exemplary embodiment a connection between the coolant/lubricant channel 69 and the second section 79 of the coolant/lubricant supply 67 is blocked by the first sealing section 75, while no second sealing section 77 is provided, so that the coolant/lubricant is able to pass from the coolant/lubricant channel 69, through the first section 73, and to the coolant/lubricant tube 87. Thus, only one centralized coolant/lubricant supply is achieved, the coolant/lubricant being centrally provided to a tool via the coolant/lubricant tube 87. Accordingly, coolant/lubricant is not able to reach the opening 83 in the end face 15 of the tool holder 1.

It is apparent from the above description that in each of the exemplary embodiments shown in FIGS. 3 and 5, a coolant/lubricant control unit 71 is provided which enables exactly one of the two possible supply paths, namely, the centralized or the decentralized supply path, while the other respective supply path is blocked.

Figure 10:
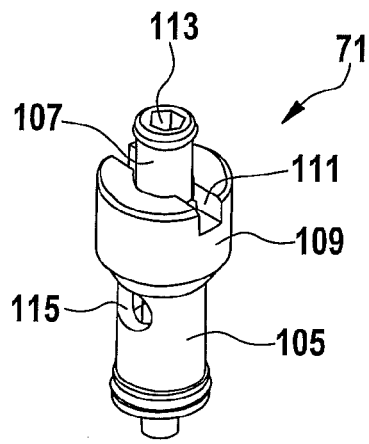
FIG. 10 shows a perspective view of another exemplary embodiment of a coolant/lubricant control unit, in a first function position.

FIG. 10 shows a coolant/lubricant control unit 71 which may have or assume essentially two function positions. For this purpose, the coolant/lubricant control unit has an external distributor element 105 and an actuator 107 which is displaceably situated therein along its longitudinal axis. FIG. 10 illustrates the coolant/lubricant control unit 71 in its first function position, in which the internal actuator 107 is moved into an upper position relative to the distributor element 105 in which the upper end of the actuator 107 protrudes from the distributor element 105.

The distributor element 105 preferably includes a region of maximum diameter which is designed as a head 109. This head is preferably used for fixing the distributor element 105 in the tool holder 1. For this purpose, the head preferably has an external thread on its circumferential surface which engages with a corresponding internal thread in the tool holder 1. An actuating unit 111 is provided by means of which the distributor element 105 may be fixed in the tool holder 1. This actuating unit is preferably designed as a slot which extends essentially perpendicularly to the longitudinal axis of the control unit 71. A screwdriver may engage here in a manner known per se in order to fix the head 109 in a corresponding internal thread of the tool holder 1 with the aid of the external thread.

The actuator 107 likewise has an actuating unit 113 by means of which the actuator is displaceable within the actuating element 105. In the present case, the actuating unit is designed as a recess having a hexagonal circumferential face in which a wrench having a hexagonal outer face, for example an Allen wrench, may engage in a known manner.

The distributor element 105 has at least two boreholes which are preferably radial, i.e., situated essentially perpendicular to the longitudinal direction, of which an upper borehole 115 is visible here. These boreholes are used to distribute the coolant/lubricant flow.

Figure 11:
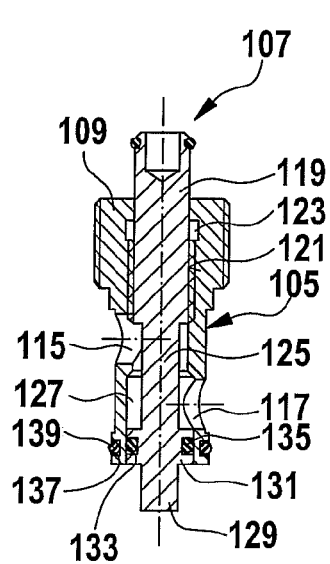
FIG. 11 shows a longitudinal section of the coolant/lubricant control unit from FIG. 10.

FIG. 11 shows a longitudinal section of the coolant/lubricant control unit from FIG. 10. Identical and functionally equivalent elements are provided with the same reference numerals; therefore, reference is made to the preceding description. The control unit 71 is also illustrated in its first function position in FIG. 11.

In addition to the upper borehole 115, a lower borehole 117 which likewise is situated essentially perpendicular to the longitudinal extension of the control unit 71 is apparent.

The actuator 107 includes an upper region 119 whose circumferential surface has an external thread, at least in places. The external thread preferably extends over the entire circumferential surface of the upper region 119. The external thread engages with an internal thread which is situated, at least in places, at an inner circumferential surface 121 of the distributor element 105. An undercut 123 designed as an annular groove is situated in the upper region of the head 109, and the internal thread at the circumferential surface 121 continues downwardly from the undercut, viewed in the axial direction. This internal thread preferably continues to the region of the lower borehole 117.

The actuator 107 has a lower region 125 whose outer diameter is smaller than the inner diameter of the distributor element 105. Thus, the outer circumferential surface of the lower part 125 of the actuator 107 on the one hand and the inner circumferential surface of the distributor element 105 on the other hand define an annular space 127 in which coolant/lubricant is able to flow.

The lower region 125 has a radial projection 131 situated at a distance from its lower end 129, viewed in the axial direction, which is preferably closer to the lower end 129 than to the upper region 119. The radial projection 131 has an outer diameter which essentially corresponds to the inner diameter of the distributor element 105.

The projection 131 includes a sealing element 135 along its circumference. In the illustrated exemplary embodiment, an annular groove 133 which is able to accommodate the sealing element 135, preferably an O-ring, which in the present case is designed as a separate element, is provided in the projection 131. In another exemplary embodiment which is not illustrated, the sealing element 135 may also be designed as one piece with the projection 131, preferably as an elastic region.

In the first function position of the coolant/lubricant control unit 71 illustrated in FIG. 11, the actuator 107 is moved upwardly until the projection 131 is situated essentially completely in the distributor element 105. The sealing element 135 lies against an inner circumferential surface of the distributor element 105, and is compressed by same so that the annular space 127 is sealed at the bottom.

In the illustrated function position, a further sealing element 139 is provided at the lower end of the distributor element 105 at approximately the same height of the sealing element 135, viewed in the axial direction. In the illustrated exemplary embodiment, the outer circumferential surface of the distributor element 105 includes an annular groove 137 in which the sealing element 139, preferably an O-ring, which in the present case is designed as a separate element, may be situated. This sealing element is used to provide sealing contact at an inner circumferential surface of the tool holder 1, as will become apparent from the description below.

The following is apparent from FIG. 11: the annular space 127 is sealed at the bottom by the sealing element 135, and at the top the external thread of the upper region 119, which is preferably designed as a fine-pitch thread and which engages with the thread situated at the inner circumferential surface 121, takes over a sealing function. The annular space 127 is thus sealed at the top and bottom. In addition, in one preferred exemplary embodiment it is possible to insert a sealing element, an O-ring, for example (not illustrated), into the undercut 123, thus providing additional sealing at this location.

Overall, it is shown that in the illustrated first function position of the coolant/lubricant control unit 71 the annular space 127 is accessible only through the boreholes 115, 117.

Figure 12:
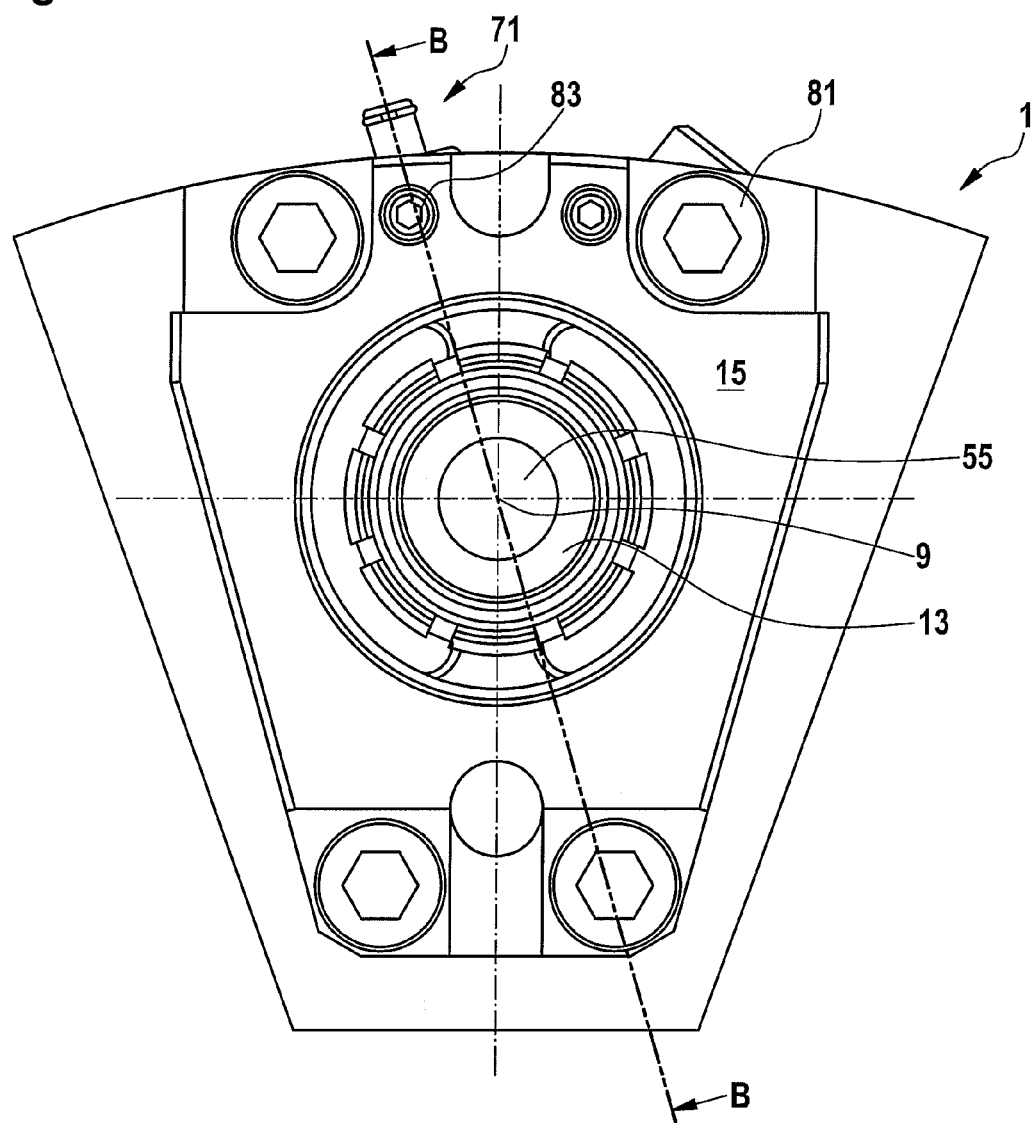
FIG. 12 shows an end face view of another exemplary embodiment of a tool holder.

FIG. 12 shows an end face view of one exemplary embodiment of the tool holder 1 in which the coolant/lubricant control unit 71 from FIG. 10 is in its first function position. Identical and functionally equivalent elements are provided with the same reference numerals; therefore, reference is made to the preceding description. In a departure from the exemplary embodiments illustrated in FIGS. 4 and 7, in the present case the coolant/lubricant control unit 71 is essentially flush with the opening 83. However, this is not important for the mode of operation of same.

Figure 13:
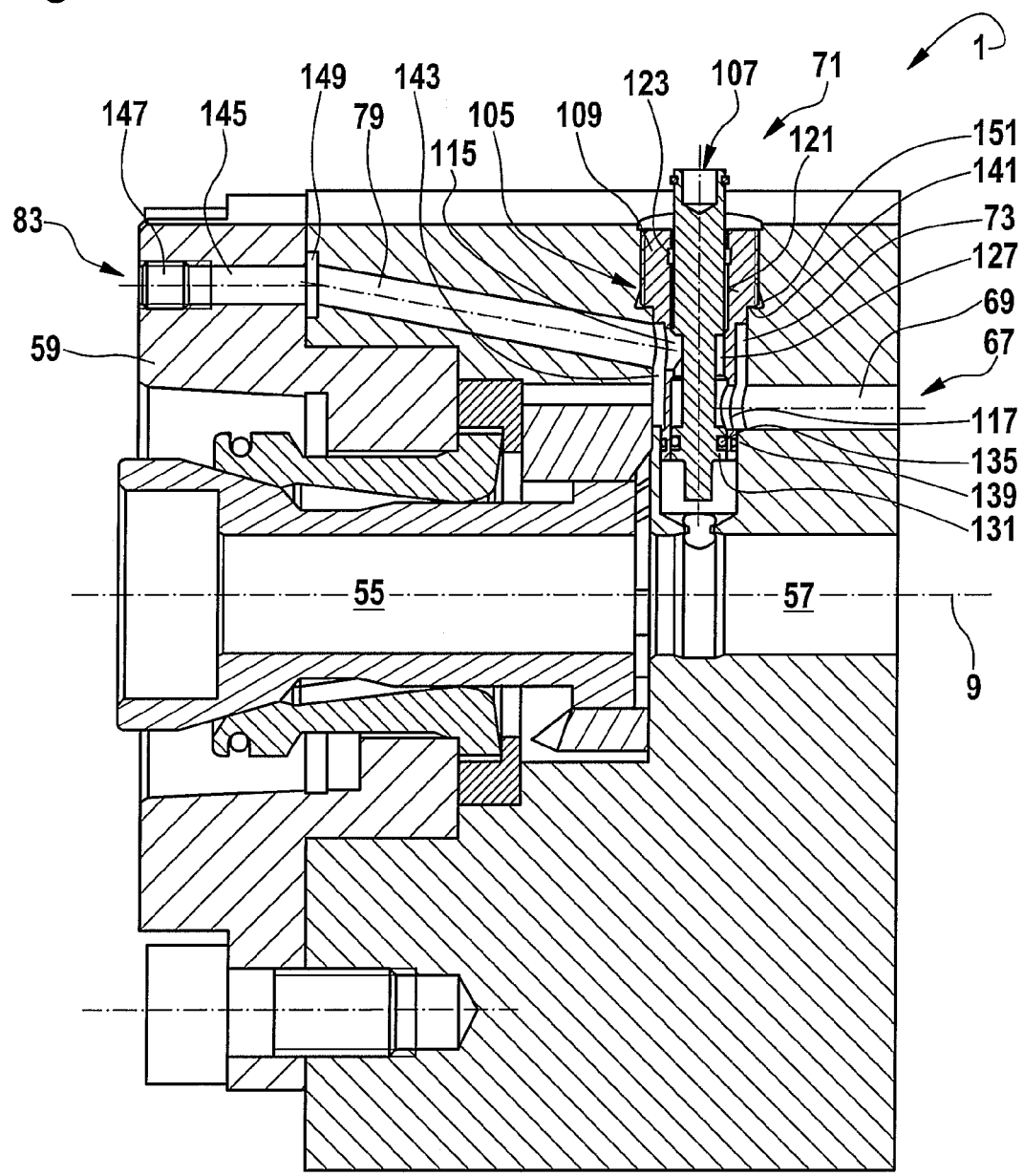
FIG. 13 shows a cross section of the tool holder from FIG. 12 in a plane in which the coolant/lubricant control unit is situated.

FIG. 13 shows a cross-sectional illustration of the tool holder 1 from FIG. 1 along line B-B. Identical and functionally equivalent elements are provided with the same reference numerals; therefore, reference is made to the preceding description.

In FIG. 13 the coolant/lubricant control unit 71 is in its first function position in the tool holder 1. In one exemplary embodiment which is not illustrated, the coolant/lubricant control unit may be designed as a mounting device which may be fixedly and securely inserted into a recess in the tool holder 1. However, in the illustrated exemplary embodiment the head 109 has an external thread at its circumferential surface which engages with a corresponding internal thread in the tool holder 1. It is thus possible to fixedly and securely anchor the coolant/lubricant control unit 71 in the tool holder 1 by screwing it into the tool holder 1, for example with the aid of the actuating unit 111 (not illustrated here).

The recess in the tool holder 1 which accommodates the coolant/lubricant control unit 71 at the same time forms the first section 73, so that the coolant/lubricant control unit 71 may be situated therein. The recess has a shoulder 141 against which the head 109 strikes, so that the coolant/lubricant control unit 71 is fixed as viewed in its axial direction.

As previously stated, the coolant/lubricant control unit 71 is illustrated here in its first function position. This means that the actuator 107 is displaced upwardly, relative to the distributor element 105, until the projection 131 is situated essentially completely inside the distributor element 105. Thus, the annular space 127 is closed off at the bottom by the sealing element 135, while at the top it is closed off by the thread, provided at the inner circumferential surface 121, which engages with the corresponding external thread of the actuator 107.

In one preferred exemplary embodiment which is not illustrated, a sealing element, an O-ring, for example, may also be provided in the undercut 123 which provides additional sealing of the annular space 127 at the top.

The following is shown: in the first function position of the coolant/lubricant control unit 71, coolant/lubricant is able to flow through the coolant/lubricant channel 69 and into the first section 73. The inner diameter of the first section 73 is preferably larger than the outer diameter of the distributor element 105, at least in the region which, viewed in the axial direction, connects the coolant/lubricant channel 69 to the second section 79. In this manner the first section 73 includes an annular space 143 which encloses the outer circumferential surface of the distributor element 105 in the region in question.

The coolant/lubricant passes from this annular space 143, through the borehole 117, and into the coolant/lubricant control unit 71. It should be noted that the annular space 143 has a very small volume and a likewise very small flow cross section. Thus, the coolant/lubricant flows from the coolant/lubricant channel 69 and essentially through the borehole 117, which has a much larger flow cross section, so that only a small portion of the coolant/lubricant flow is distributed over the annular space 143.

The coolant/lubricant passes through the borehole 117 and into the annular space 127, which, as stated, is sealed at the bottom by the sealing element 135 and is sealed at the top by the described thread. The coolant/lubricant thus re-emerges from the borehole 115 and passes, once again via the annular space 143, into the second section 79 of the coolant/lubricant supply 67. A borehole 145 which passes through the mounting flange 59 and has the opening 83 adjoins the second section. In one preferred exemplary embodiment, the opening 83 may be closed off by a set screw 147 when no coolant/lubricant supply is desired at this location. The set screw 147 must then be removed in order to withdraw coolant/lubricant from the opening 83.

To close off the opening 83, in other preferred exemplary embodiments other types of screws or suitable plugs may also be used. It is only important that the opening 83 is able to be reliably closed when no coolant/lubricant is to exit therefrom.

A groove 149 may be provided in the surface facing the mounting flange 59 in the tool holder 1. The coolant/lubricant may be distributed over various boreholes 145 or various openings 83 via this groove. Within the meaning of a reverse function, in another exemplary embodiment the groove 149 may also be situated in the face of the mounting flange 59 facing the tool holder 1. Openings from which no coolant/lubricant is to exit may then be closed off using set screws 147, for example, while the openings from which coolant/lubricant is to exit have no set screws 147 or other closures, and are therefore accessible.

It is also shown that the distributor element 105 at its lower end has an outer diameter which essentially corresponds to the inner diameter of the first section 73. In this manner, the sealing element 139 provides sealing contact at the inner wall of the first section 73, so that the annular space 143 is sealed at the bottom by the sealing element. In addition, the annular space 143 is sealed at the top by the external thread, situated at the head 109, which engages with the corresponding internal thread of the tool holder 1. In the region of the shoulder 141 an undercut 151 is preferably situated, into which a sealing element may be inserted in one exemplary embodiment which is not illustrated. This sealing element may be used for additional sealing of the annular space 143 at the top.

The following is apparent: when the coolant/lubricant control unit 71 is in its first function position, a fluid connection is enabled between the first section 73 and the second section 79, essentially via the borehole 117, the annular space 127, and the borehole 115. The coolant/lubricant also flows, at least partially, through the annular space 143. However, the quantity flowing through at this location is negligible due to the small volume and very small flow cross section of the annular space.

It is also shown that the annular space 127 and the annular space 143, which are closed off at the bottom by sealing elements 135 and 139, respectively, are blocked so that no coolant/lubricant is able to pass from the first section 73 into the cavity 57. Thus, in the first function position of the coolant/lubricant control unit 71 only a decentralized supply of coolant/lubricant is provided, while access to the cavity 57 in which a coolant/lubricant tube 87 may be at least partially situated is blocked, so that in this first function position a centralized supply of coolant/lubricant is excluded.

Figure 14:
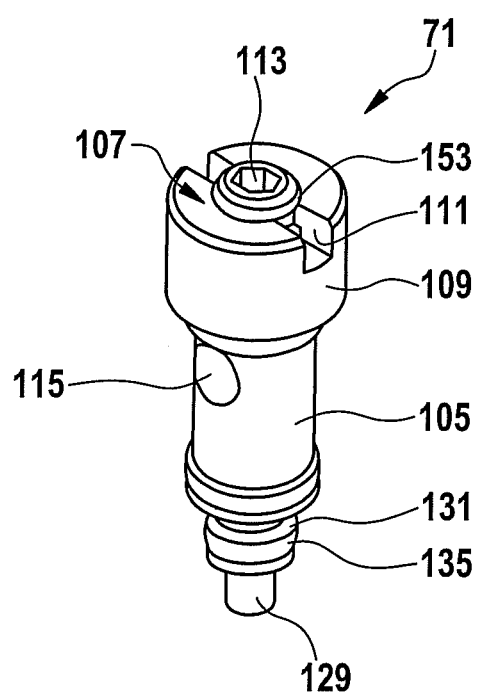
FIG. 14 shows a perspective view of the coolant/lubricant control unit from FIG. 10, in a second function position.

FIG. 14 shows the exemplary embodiment of a coolant/lubricant control unit 71 according to FIG. 10, which in the present case, however, is in its second function position. Identical and functionally equivalent elements are provided with the same reference numerals; therefore, reference is made to the preceding description. In the present case the actuator 107 is moved downwardly relative to the distributor element 105 until the actuator strikes a stop 153 at the end face of the head 109. The stop 153 may be designed as a snap ring, for example, which is inserted into a groove provided in the actuator 107. In other exemplary embodiments it is also possible to design the stop 153 as one piece with the actuator 107, or to provide some other suitable element, for example a spring element.

In the illustrated second function position, the projection 131 together with the sealing element 135 protrudes from the distributor element 105.

The actuator 107 is preferably moved from the first function position to the second function position by activating the actuating element 113. When the actuator 107 has an external thread which engages with a corresponding internal thread of the distributor element 105, the actuator may be screwed into the distributor element 105 via the actuating element 113 in order to move from its first function position to its second function position. Conversely, the actuator may be screwed out from the distributor element 105 in order to move from the second function position to the first function position. Other displacement mechanisms are possible in other exemplary embodiments which are not illustrated. For example, at least two detent positions may be provided in the distributor element 105 for the actuator 107 which correspond to the first or second function position. The actuator 107 may then be moved from a first to a second detent position, optionally by a strictly axial displacement or by superimposing an axial displacement with a rotary or swivel motion. The actuating element 113 may also be used for this purpose.

Figure 15:
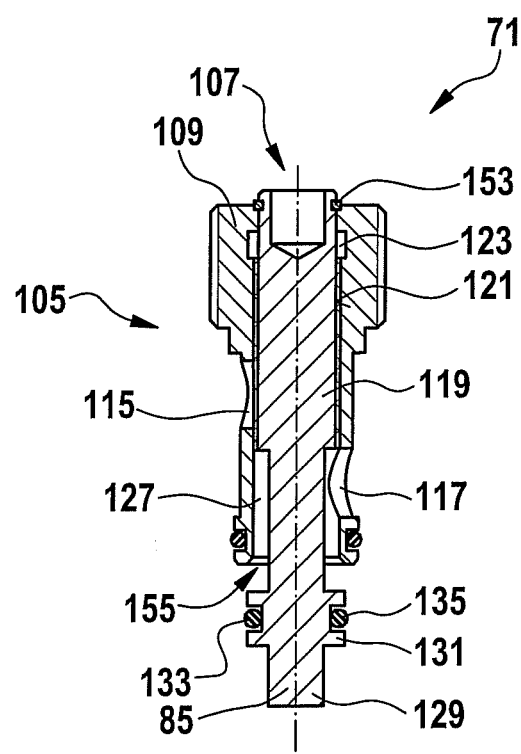
FIG. 15 shows a longitudinal section of the coolant/lubricant control unit from FIG. 14.

FIG. 15 shows a longitudinal section of the coolant/lubricant control unit 71 in its second function position according to FIG. 14. Identical and functionally equivalent elements are provided with the same reference numerals; therefore, reference is made to the preceding description. In FIG. 15 it is apparent that the projection 131 is situated completely outside the distributor element 105. At the same time, the upper region 119 of the actuator 107 is moved so far into the distributor element that the external thread situated at the circumferential surface of the actuator engages with the internal thread situated at the inner circumferential surface 121, also in a region which, viewed in the axial direction, is situated beneath the borehole 115. The annular space 127 is thus moved downwardly compared to the first function position as shown in FIG. 11, for example, the annular space being sealed at the top by the thread situated at the actuator 107 or the inner circumferential surface 121 in such a way that the borehole 115 is not accessible. In one preferred exemplary embodiment which is not illustrated, a sealing element may also be provided at the lower end of the upper region 119 which provides additional sealing of the annular space 127 at the top. This sealing element may preferably be provided as a projection which is designed in one piece with the actuator 107, or as a separate sealing element, for example as an O-ring which is inserted into a groove.

As a result of the projection 131 being situated completely outside the distributor element 105 so that the sealing element 135 also does not make sealing contact at its inner wall, the annular space 127 has an opening 155 at its lower end.

Also apparent is the end 129 of the lower region 125 of the actuator 107, which is designed as a shoulder 85, as described below.

Figure 16:
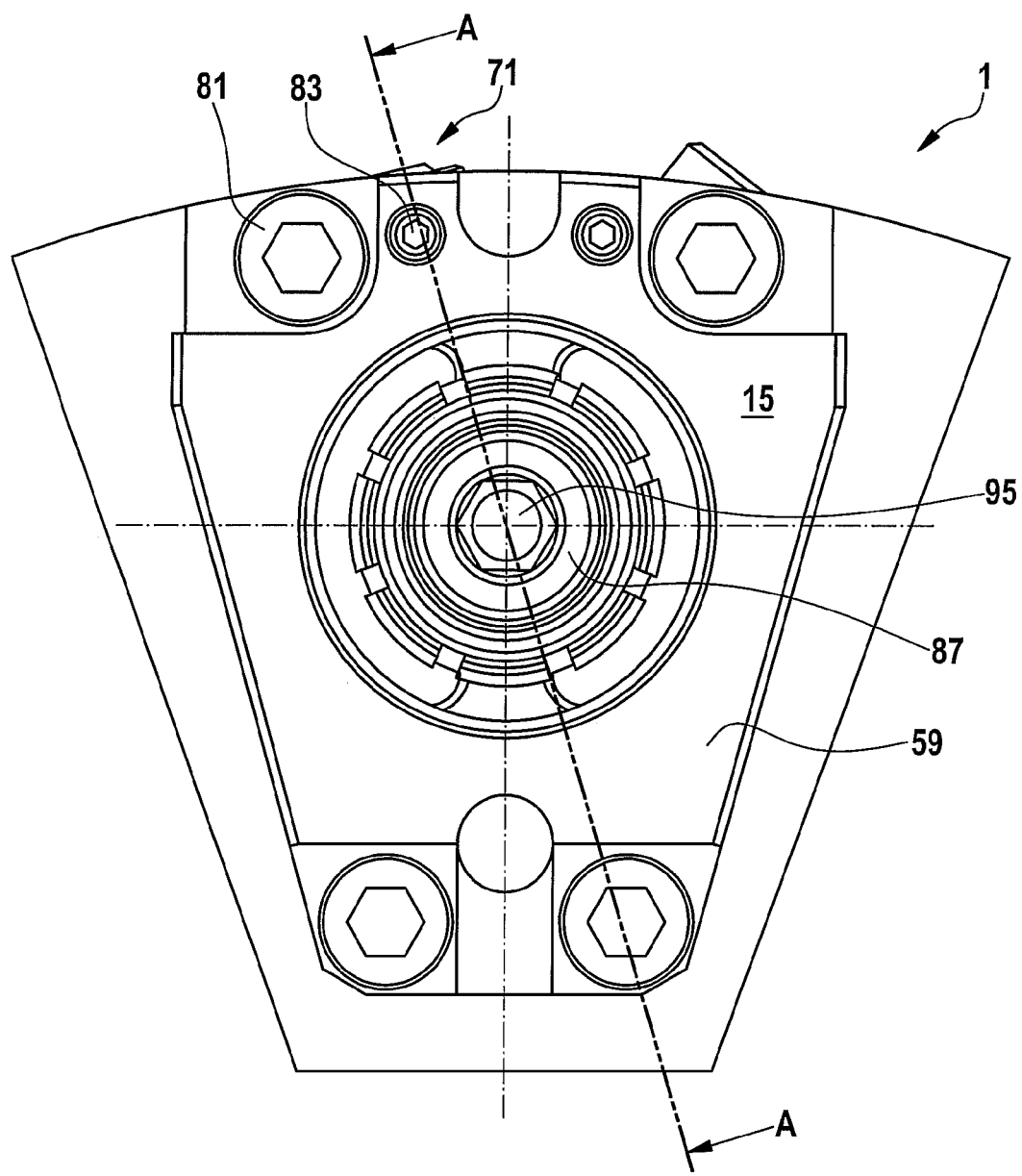
FIG. 16 shows an end face view of the tool holder according to FIG. 12 in which the coolant/lubricant control unit is in its second function position.

FIG. 16 shows an end face view of another exemplary embodiment of a tool holder 1. Identical and functionally equivalent elements are provided with the same reference numerals; therefore, reference is made to the preceding description. In the tool holder 1 illustrated here, a coolant/lubricant control unit 71 is provided which is designed according to FIGS. 14 and 15 and which is in its second function position. It is also apparent that a coolant/lubricant tube 87 is situated in the tool holder 1 in the manner previously described in conjunction with FIG. 5. The tool holder has a hollow interior 95 which passes through the coolant/lubricant tube 87 as previously described, from the end face thereof facing the mounting flange 59 to a closed end 89, not illustrated here.

Figure 17:
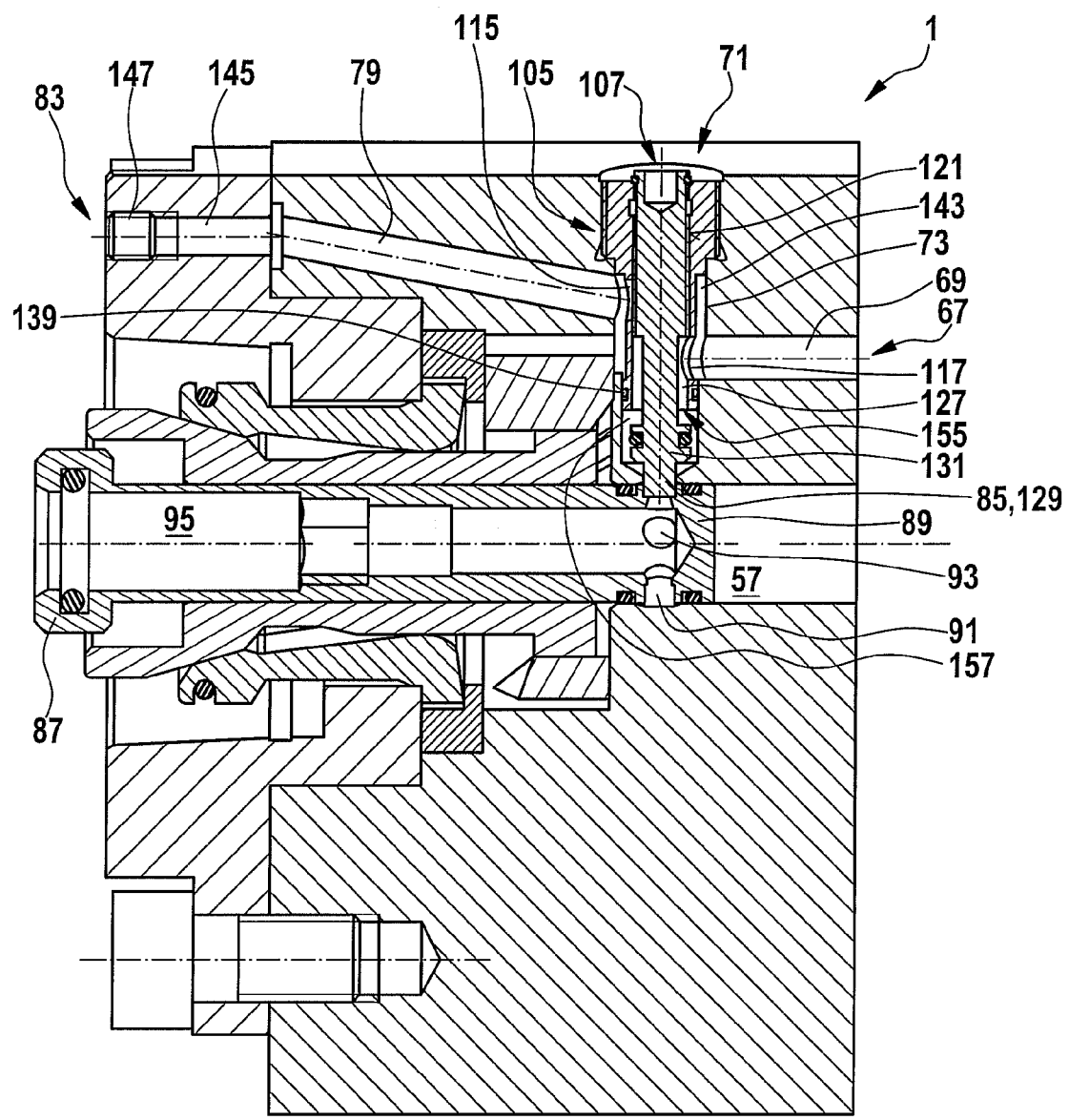
FIG. 17 shows a cross section of the tool holder from FIG. 16 in a plane in which the coolant/lubricant control unit is situated.

FIG. 17 shows a sectional view of the tool holder 1 from FIG. 16 along line A-A. Identical and functionally equivalent elements are provided with the same reference numerals; therefore, reference is made to the preceding description. The closed end 89 of the coolant/lubricant tube 87, which extends to the hollow interior 95, is apparent here.

In the present case the coolant/lubricant control unit 71 is fixed in the tool holder 1 in the same way as described in conjunction with FIG. 13. In this regard, reference is made to the description for that figure. In the present case, however, the coolant/lubricant control unit is in its second function position, so that the actuator 107 is moved downwardly the maximum distance relative to the distributor element 105, i.e., to the delimitation provided by the stop 153. As previously described in conjunction with FIG. 15, the annular space 127 is sealed off at the top by the thread situated at the actuator 107 and the inner circumferential surface 121, in a region beneath the borehole 115, so that this borehole is not accessible from the annular space 127. Instead, an opening 155 is enabled due to the fact that the projection 131 is situated completely outside the distributor element 105.

As previously stated, in the present case the end 129 functions as a shoulder 85 which extends to an annular groove 91 in the coolant/lubricant tube 87 and fixes same in its axial direction.

In the illustrated function position of the coolant/lubricant control unit 71, coolant/lubricant flows from the coolant/lubricant channel 69 into the first section 73 of the coolant/lubricant supply 67, and in particular through the borehole 117, into the annular space 127 of the coolant/lubricant control unit 71. As previously described, this annular space is closed at the top with respect to the borehole 115, so that no coolant/lubricant is able to reach this location. The coolant/lubricant thus flows through the opening 155 into a lower region 157 of the first section 73. From here, the coolant/lubricant passes into the annular groove 91, in which at least one borehole 93 is provided, in a manner previously described in conjunction with FIGS. 5 and 6, via which the coolant/lubricant is able to pass into the interior 95 of the coolant/lubricant tube 87.

The lower region 157 of the first section 73 is sealed with respect to the annular space 143 by means of the sealing element 139 so that no coolant/lubricant is able to flow back at this location.

Due to the ratio of the flow cross sections of the borehole 117 to the annular space 143, only a small amount of coolant/lubricant passes into the annular space 143. However, this coolant/lubricant may optionally pass into the second section 79, and thus also to the borehole 145 or the opening 83. As a rule, however, little or no coolant/lubricant exits at this location, since the fraction of the coolant/lubricant flow which enters the annular space 143 is too small. In order to still completely and reliably prevent coolant/lubricant from exiting the opening 83, the opening may be closed as previously described, using a set screw 147, for example.

In another exemplary embodiment not illustrated, it is also possible to adapt the outer diameter of the distributor element 105 to the first region 73 in such a way that no annular space 143 is provided. In this case, coolant/lubricant is able to flow only through the boreholes 117 and 115 or the opening 155, so that in particular in the second function position of the coolant/lubricant control unit 71 no coolant/lubricant is able to pass into the second section 79.

Thus, the following is clear: in the second function position a fluid connection is enabled between the first section 73 and the coolant/lubricant tube 87 via the borehole 117, the annular space 127, the opening 155, the lower region 157, the annular groove 91, and the at least one borehole 93. Coolant/lubricant is thus able to flow from the coolant/lubricant channel 69 into the interior 95 of the coolant/lubricant tube 87, and is therefore available for a centralized coolant/lubricant supply. At the same time, coolant/lubricant flow to the second section 79 is practically, or preferably completely, prevented, thus blocking a fluid connection between the first section 73 and this second section 79. A decentralized coolant/lubricant supply is therefore excluded in the second function position of the coolant/lubricant control unit 71.

In light of the above, it is shown that in all the exemplary embodiments of a tool holder 1 described herein a coolant/lubricant control unit 71 may be used which ensures simple switching between a centralized or a decentralized coolant/lubricant supply. This exemplary embodiment of a coolant/lubricant control unit 71 does not have to be exchanged in order to switch the supply, and instead may be easily brought from a first function position to a second function position or vice versa, the two function positions corresponding to a different type of supply. Switching the supply is thus possible in a much quicker and less complicated manner than the case in which a separate coolant/lubricant control unit 71 must be provided for each type of supply. In addition, there is no need for storing such control units, which therefore also cannot be lost.

In the two embodiments of the tool holder 1 it is also easily possible to guide an actuating element, which is designed as a drive shaft, for example, through the hollow tension rod 13, and to set a cutting edge of a tool inserted in the tool holder 1 in rotation.

It is particularly advantageous that the tool holder 1 may have a very short design due to the fact that the actuating unit 27 acts on one side face of the tension rod 13, so that the free end 29 of the tension rod inside the tool holder 1 may have an open design and be accessible for an actuating element. It is also easily possible to introduce a coolant/lubricant tube 87 into the hollow tension rod 13 and axially fix it in order to achieve a centralized coolant/lubricant supply.

In all cases it is shown that a short design and also a central passage through the tool holder 1 may be achieved.

The invention claimed is:

1. A tool holder comprising:
a center axis;
a chucking device having at least one collet chuck insertable into a hollow shaft of a tool;
a tension rod having at least one engagement part, the tension rod movable in a direction of the center axis and cooperable with the at least one collet chuck such that in a first function position of the tension rod the at least one collet chuck is displaced radially outwardly into a chucking position, and in a second function position of the tension rod the at least one collet chuck is able to yield radially inwardly in the direction of the center axis; and
an actuating unit cooperating with the tension rod, the actuating unit having an actuating element which is movable at an angle of 90° relative to the center axis, and which includes at least one actuating part, the actuating part and the engagement part forming a wedge mechanism, so that the actuating part causes an axial displacement of the tension rod when the actuating element is radially displaced.

2. The tool holder according to claim 1, wherein the wedge mechanism has a double-acting design.

3. The tool holder according to claim 1, wherein the actuating element laterally engages with the tension rod.

4. The tool holder according to claim 1, wherein the actuating element includes a receiving slot having two inner faces parallel to one another and oriented radially with respect to the center axis, in which the tension rod may be situated, an actuating part being provided at at least one inner face which cooperates with an engagement part at the tension rod.

5. The tool holder according to claim 4, wherein an actuating part is provided at both inner faces.

6. The tool holder according to claim 1, wherein the actuating unit has a threaded spindle which on the one hand engages in the actuating element and on the other hand engages in the tool holder.

7. The tool holder according to claim 1, further comprising a threaded element introduceable into the tool holder and having an internal thread for the threaded spindle and the threaded elemenet being a threaded ring having an external thread.

8. The tool holder according to claim 1, further comprising a coolant/lubricant supply.

9. The tool holder according to claim 8, further comprising a coolant/lubricant control unit.

10. The tool holder according to claim 1, wherein the tension rod has a hollow design.

11. The tool holder according to claim 10, wherein an actuating element is passed through the hollow tension rod.

12. The tool holder according to claim 10, wherein a coolant/lubricant tube is inserted in the tension rod and extends coaxially with respect to the center axis.

13. The tool holder according to claim 12, wherein the coolant/lubricant control unit is a fixing device which engages in an interior end of the coolant/lubricant tube.

14. The tool holder according to claim 13, wherein the fixing device is situated essentially perpendicular to the center axis.

15. The tool holder according to claim 9, wherein the coolant/lubricant control unit is situated in a coolant/lubricant channel of the coolant/lubricant supply.

16. The tool holder according to claim 15, wherein the coolant/lubricant channel has a first section which leads to a receptacle in the tool holder that accommodates a coolant/lubricant tube which may be inserted into the hollow tension rod and which extends coaxially with respect to the center axis.

17. The tool holder according to claim 15, wherein the coolant/lubricant channel has a second section which leads to an end face of the tool holder into which a tool having a hollow taper shank may be inserted.

18. The tool holder according to claim 17, wherein the coolant/lubricant control unit is designed in such a way that a fluid connection between the first section and a cavity may be closed by the coolant/lubricant control unit, while a fluid connection between the first section and the second section may be enabled.

19. The tool holder according to claim 17, wherein the coolant/lubricant control unit is designed in such a way that a fluid connection between the first section and the coolant/lubricant tube may be enabled by the coolant/lubricant control unit, while a fluid connection between the first section and the second section may be closed.

20. The tool holder according to claim 17, wherein the coolant/lubricant control unit has a first function position and a second function position, wherein:
- in the first function position a fluid connection between the first section and a cavity may be closed, while a fluid connection between the first section and the second section may be enabled; and
- in the second function position the fluid connection between the first section and the coolant/lubricant tube may be enabled, while the fluid connection between the first section and the second section may be closed.

21. The tool holder according to claim 1, further comprising a guide unit radially supporting the tension rod in the tool holder.

22. The tool holder according to claim 1, further comprising a mounting flange for fixing the hollow taper shank chucking device in the tool holder.

23. The tool holder according to claim 1, wherein the tool holder has multiple hollow taper shank chucking devices.

24. The tool holder according to claim 1, wherein the tool holder is designed as a drum turret.

25. The tool holder according to claim 1, wherein the tool holder is designed as a star turret.

\* \* \* \* \*